(12) United States Patent
Wiens-Kind et al.

(10) Patent No.: US 11,409,253 B2
(45) Date of Patent: Aug. 9, 2022

(54) SYSTEMS AND METHODS FOR COMMISSIONING BUILDING EQUIPMENT WITH MOBILE SERVER

(71) Applicant: Johnson Controls Technology Company, Auburn Hills, MI (US)

(72) Inventors: Garrett Wiens-Kind, Milwaukee, WI (US); Robert D. Turney, Watertown, WI (US); Daniel J. Brandt, Milwaukee, WI (US); Zijian Cao, Milwaukee, WI (US); Fang Du, Milwaukee, WI (US); Shaoyan Pan, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 127 days.

(21) Appl. No.: 16/719,611

(22) Filed: Dec. 18, 2019

(65) Prior Publication Data

US 2020/0201275 A1 Jun. 25, 2020

Related U.S. Application Data

(60) Provisional application No. 62/782,270, filed on Dec. 19, 2018.

(51) Int. Cl.
*G05B 19/042* (2006.01)

(52) U.S. Cl.
CPC .. *G05B 19/042* (2013.01); *G05B 2219/25011* (2013.01); *G05B 2219/2614* (2013.01)

(58) Field of Classification Search
CPC ........ G05B 19/042; G05B 2219/25011; G05B 2219/2614; G05B 2219/25062; G05B 19/0426
See application file for complete search history.

(56) References Cited

U.S. PATENT DOCUMENTS

| | | | |
|---|---|---|---|
| 9,749,782 B2* | 8/2017 | Jovicic | H04W 4/029 |
| 2016/0313713 A1* | 10/2016 | Lemke | H05B 47/18 |
| 2018/0121662 A1* | 5/2018 | Pelton | G06F 21/64 |
| 2020/0066032 A1* | 2/2020 | Li | H04W 4/44 |

FOREIGN PATENT DOCUMENTS

KR 20200001289 A * 1/2020

* cited by examiner

*Primary Examiner* — Mohammad Ali
*Assistant Examiner* — Sheela Rao
(74) *Attorney, Agent, or Firm* — Foley & Lardner LLP

(57) ABSTRACT

A mobile commissioning device for commissioning building equipment in or around a building includes a processing circuit. The processing circuit includes a processor and memory storing instructions executed by the processor. The processing circuit establishes location of the mobile commissioning device and building equipment within the building. The processing circuit also detects and receives commissioning data from building equipment located within a building zones of the building as the mobile commissioning device moves between the building zones. The processing circuit further stores the commissioning data from the building equipment in a temporary commissioning database within the mobile commissioning device and transmits the commissioning data from the temporary commissioning database to a permanent server.

18 Claims, 17 Drawing Sheets

SYSTEMS AND METHODS FOR COMMISSIONING BUILDING EQUIPMENT WITH MOBILE SERVER

CROSS-REFERENCE TO RELATED PATENT APPLICATIONS

This application claims priority to and benefit of U.S. Provisional Application No. 62/782,270, filed Dec. 19, 2018, which is incorporated herein by reference in its entirety.

BACKGROUND

The present disclosure relates generally to commissioning building automation systems (BAS) during and following construction of a building. The present disclosure relates more particularly to commissioning various types of building equipment of a BAS (e.g., BAS security systems and HVAC systems) during and following construction of a building.

BAS security and HVAC systems are often commissioned in the final stages of the construction of buildings. Commissioning BAS security and HVAC systems in the final stages of construction processes can extend construction timelines and delay the completion of construction, which can delay the building becoming fully operational.

Immediate operation of a building upon the completion of construction processes is desirable. Further, shortening the duration of construction processes allows for a building to be operable as soon as possible. As such, shortening and/or eliminating commissioning BAS security systems and HVAC systems during the final construction processes is also desirable.

SUMMARY

One implementation of the present disclosure includes a mobile commissioning device for commissioning building equipment in or around a building. The device includes a processing circuit having a processor and memory storing instructions executed by the processor. The processing circuit is configured to establish location of the mobile commissioning device and the building equipment within the building, detect and receive commissioning data from the building equipment located within building zones of the building as the mobile commissioning device moves between the plurality of building zones, store commissioning data from the building equipment in a temporary commissioning database within the mobile commissioning device, and transmit commissioning data from the temporary commissioning database to a permanent server.

In some embodiments, the device includes a mobile server and a battery.

In some embodiments, the device is configured to determine and store location data relating to both the mobile commissioning device as well as the building equipment.

In some embodiments, location data relating to the mobile commissioning device is generated and stored by the mobile commissioning device and is subsequently used to obtain and store location data relating to the building equipment.

In some embodiments, the device includes one or more relay devices, the one or more relay devices configured to receive device signals from the building equipment and transmit relay signals to the mobile commissioning device.

In some embodiments, the one or more relay devices are positioned and can be repositioned within the building zones of the building.

In some embodiments, the device signals received by the one or more relay devices from the building equipment contain commissioning data, and the relay signals transmitted by the one or more relay devices to the mobile commissioning device contain commissioning data received by the one or more relay devices from the building equipment.

In some embodiments, the processing circuit is configured to store commissioning data in accordance with a data structure used by the permanent server such that the permanent server can use commissioning data during operation without additional processing.

In some embodiments, the device is configured to operate autonomously and move independently through the plurality of building zones to receive commissioning data from the building equipment.

In some embodiments, the device is configured to move along a predetermined path through one or more of the building zones in order to commission the building equipment.

Another implementation of the present disclosure includes a system for commissioning building equipment in or around a building. The system includes a mobile commissioning device having a processing circuit, the processing circuit having a processor and memory storing instructions executed by the processor. The processing circuit is configured to establish location of the mobile commissioning device and the building equipment within the building, detect and receive commissioning data from the building equipment located within building zones of the building as the mobile commissioning device moves between the plurality of building zones, store commissioning data from the building equipment in a temporary commissioning database within the mobile commissioning device, and transmit commissioning data from the temporary commissioning database to a permanent server.

In some embodiments, the system includes a mobile server and a battery.

In some embodiments, the system is configured to determine and store location data relating to both the mobile commissioning device as well as the building equipment.

In some embodiments, the system includes location data relating to the mobile commissioning device is generated and stored by the mobile commissioning device and is subsequently used to obtain and store location data relating to the building equipment.

In some embodiments, the system includes one or more relay devices, the one or more relay devices configured to receive device signals from the building equipment and transmit relay signals to the mobile commissioning device.

In some embodiments, the system includes one or more relay devices are positioned and can be repositioned within the building zones of the building.

In some embodiments, the system includes device signals received by the one or more relay devices from the building equipment contain commissioning data, and the relay signals transmitted by the one or more relay devices to the mobile commissioning device contain commissioning data received by the one or more relay devices from the building equipment.

In some embodiments, the system includes the processing circuit configured to store commissioning data in accordance with a data structure used by the permanent server such that the permanent server can use commissioning data during operation without additional processing.

In some embodiments, the system includes the device configured to operate autonomously and move independently through the plurality of building zones to receive commissioning data from the building equipment.

One implementation includes a method of commissioning building equipment using a mobile commissioning device having a processing circuit, wherein the processing circuit includes a processor and memory storing instructions executed by the processor. The method includes establishing location of the mobile commissioning device and the building equipment within the building, detecting and receive commissioning data from the building equipment located within building zones of the building as the mobile commissioning device moves between the building zones, storing commissioning data from the building equipment in a temporary commissioning database within the mobile commissioning device, and transmitting commissioning data from the temporary commissioning database to a permanent server.

DETAILED DESCRIPTION

Overview

Figure 1:
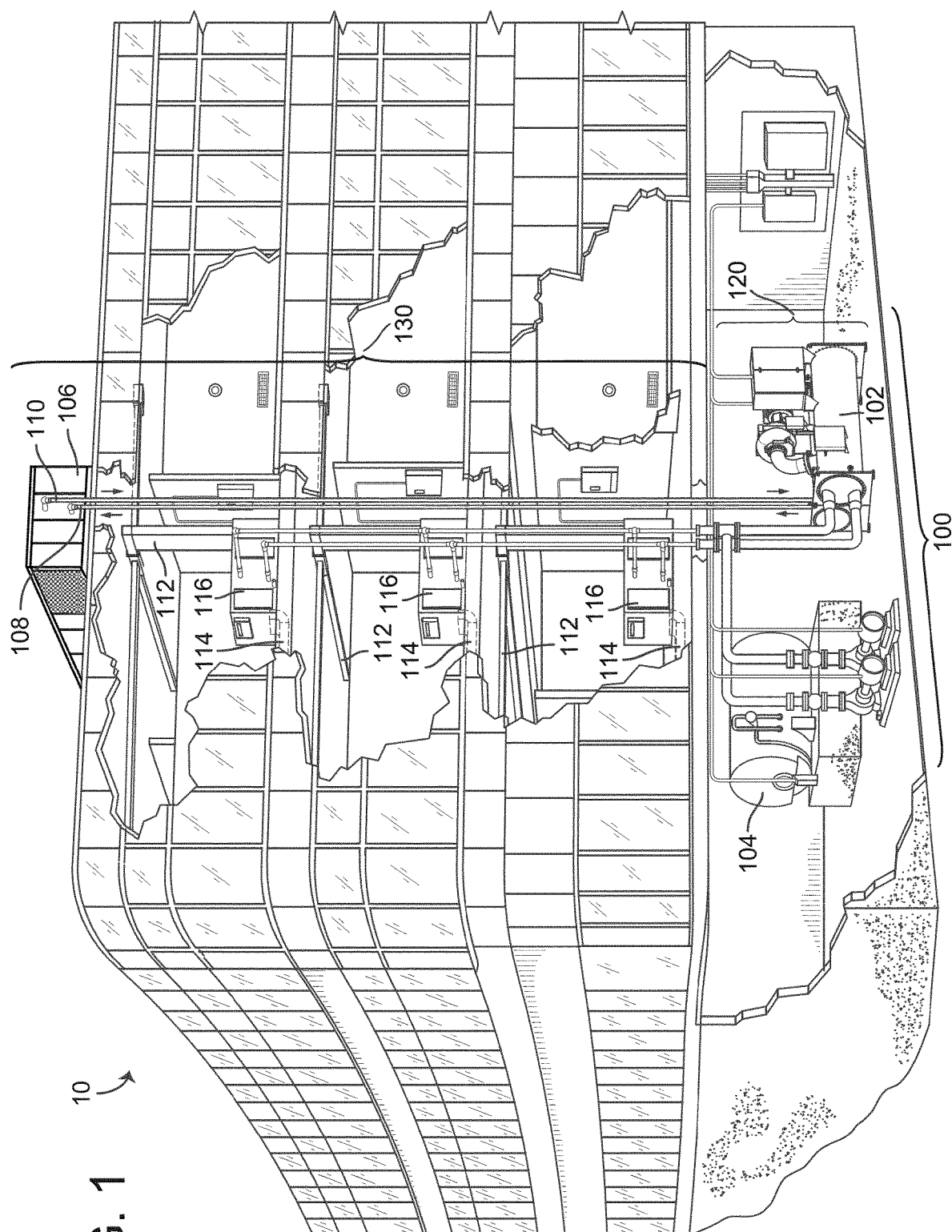
FIG. 1 is a drawing of a building equipped with a HVAC system, according to some embodiments.

It is common in the construction of new buildings for various equipment and other components that will be critical to the operation of the completed building to be installed in stages. In some instances, this may be a function of certain installations and placements of equipment needing to be completed in series with a number of other prerequisite tasks, while in other instances this may occur due to the timeline and scheduling of various contractors and others involved in the construction of a building. Practices such as this may lead to potential issues particularly in terms of the installation of components that rely on other components yet to be installed, for example installed equipment waiting on the installation of wiring may not be operational until the wiring is completed and/or may be subject to certain risks, depending on the equipment and the specific situation.

Much of the equipment and many of the components that may be installed in a building prior to the completion of the entirety of the construction may be of a value that necessitates security service in order to ensure safety of the equipment and components. Possibly among these pieces of equipment and components are HVAC and BAS equipment. In some instances, it is ideal for HVAC and building automation systems (BAS) to be installed prior to the installation of the components needed in order to implement a security system. Thus, the HVAC and BAS equipment may be left unmonitored and unsecured for a period of time prior to the completion of the building or may be subject to security coverage provided by unreliable temporary systems. In such instances, it is common for supervisors and others involved with the construction of the building as well as the HVAC and BAS equipment to desire reliable and effective security for said equipment.

As such with the installation of hardware prior to the building being fully operational and completed, some components may not receive the benefits provided by a permanently installed security system while the building may be under construction. In some cases, this may be due to issues such as waiting for the building to be fully wired and operational before security service is available, while in other instances this may be attributed to plans to implement a security system only after the building is completed so as to prevent having to set up a temporary security system and then later configure a permanent security system. In some instances, the time and labor demands of establishing a temporary security system for the duration of the construction period and also establishing a more permanent security system when the building has been completed may not be desirable, or may not align with other objectives and priorities for the construction of the building.

The systems and methods described herein address the security of HVAC and BAS equipment (but is not necessarily limited to those pieces of equipment) and the security of said systems both during construction and after the construction has been completed.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 2:
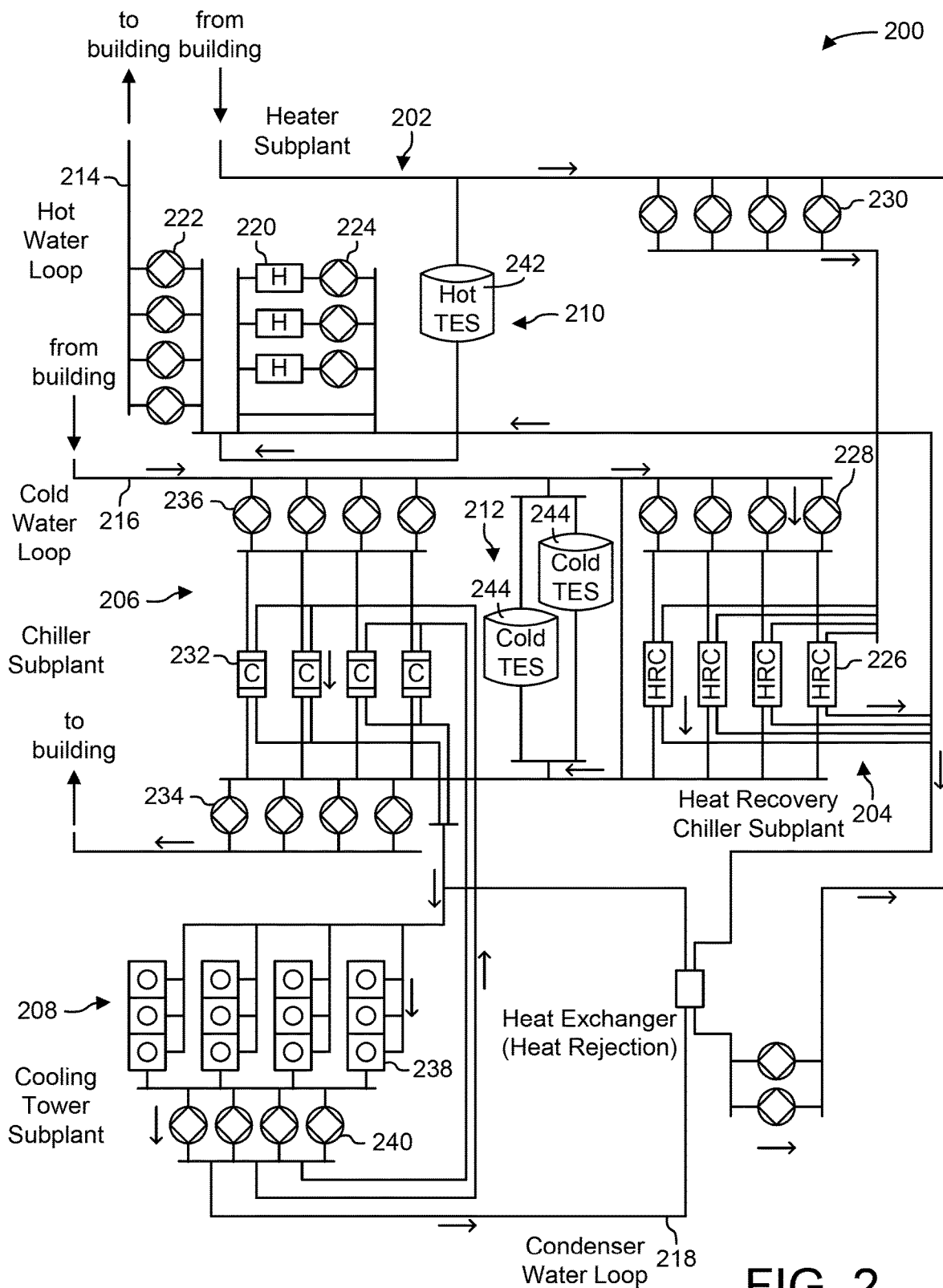
FIG. 2 is a schematic diagram of a waterside system which can be used in conjunction with the building of FIG. 1, according to some embodiments.
Figure 3:
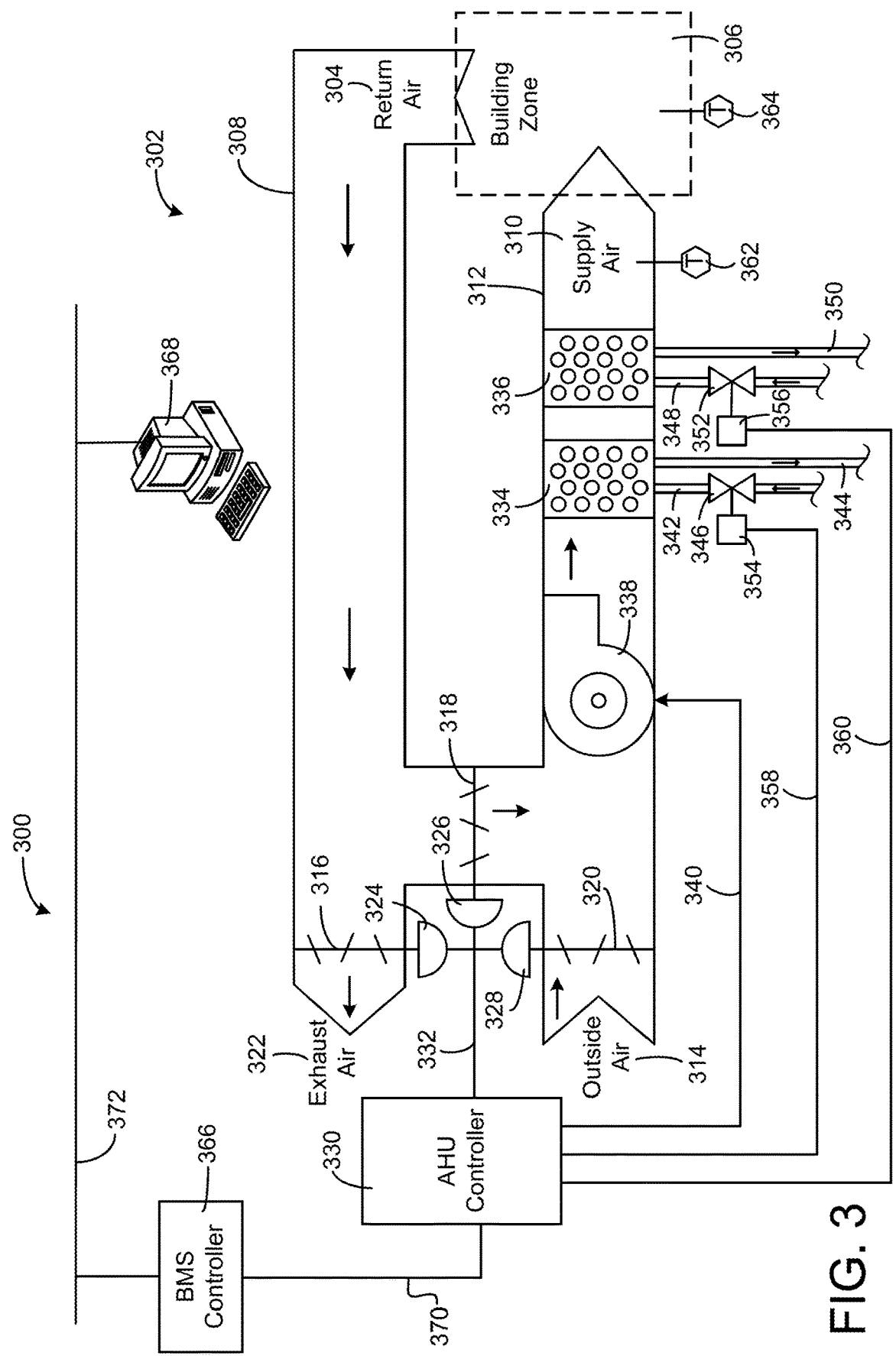
FIG. 3 is a schematic diagram of an airside system which can be used in conjunction with the building of FIG. 1, according to some embodiments.
Figure 4:
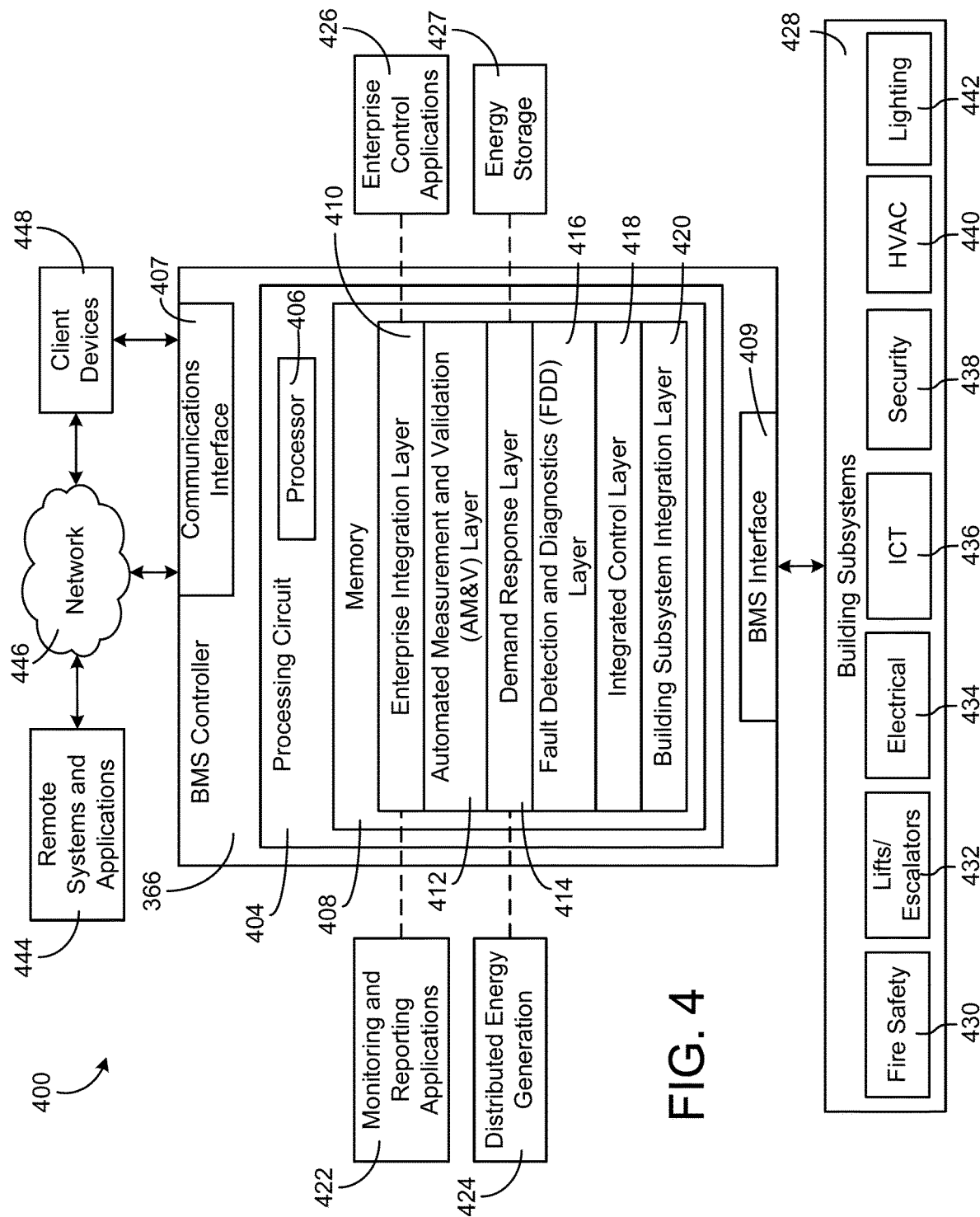
FIG. 4 is a block diagram of a building management system (BMS) which can be used to monitor and control the building of FIG. 1, according to some embodiments.
Figure 5:
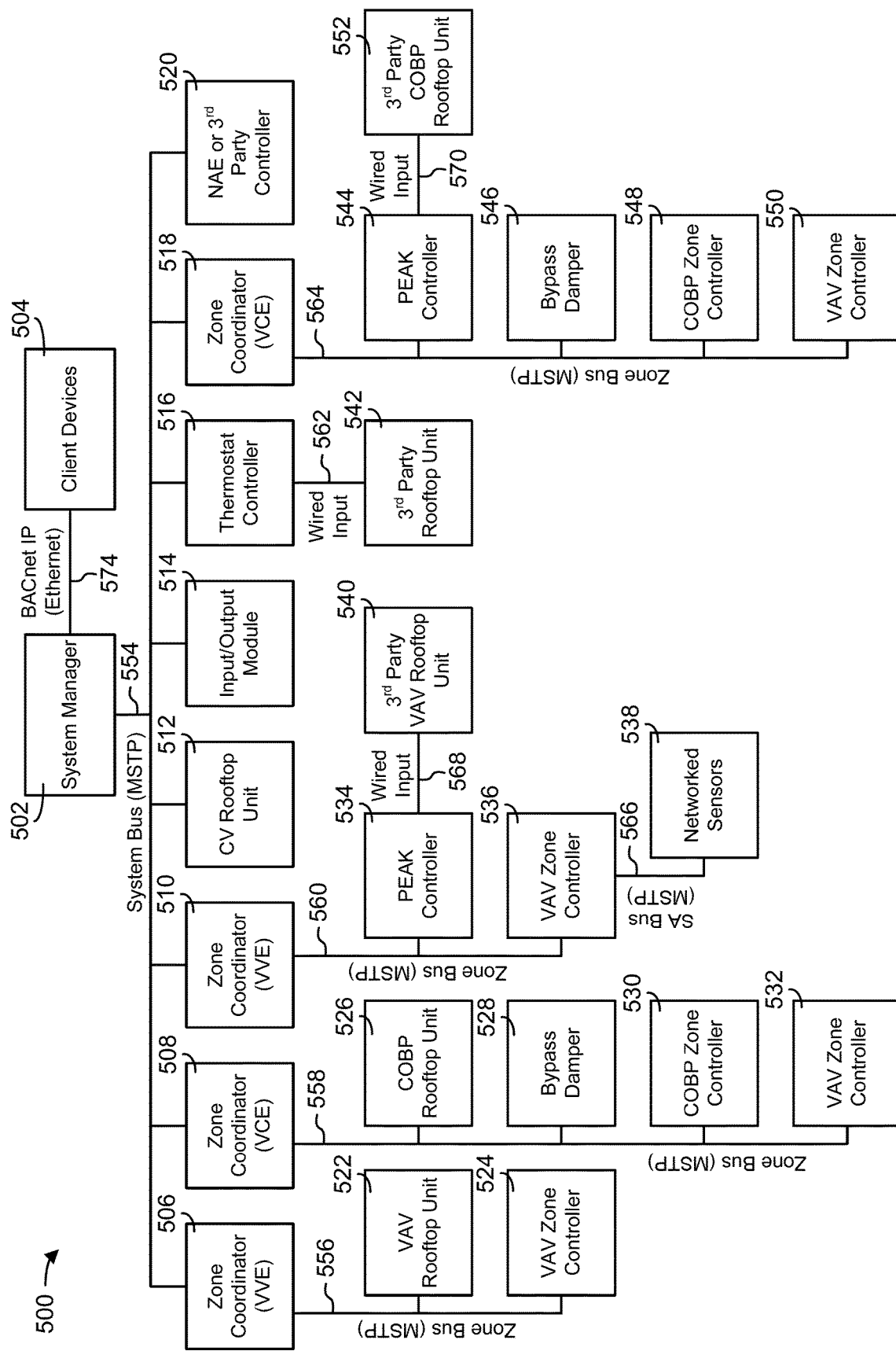
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Figure 6:
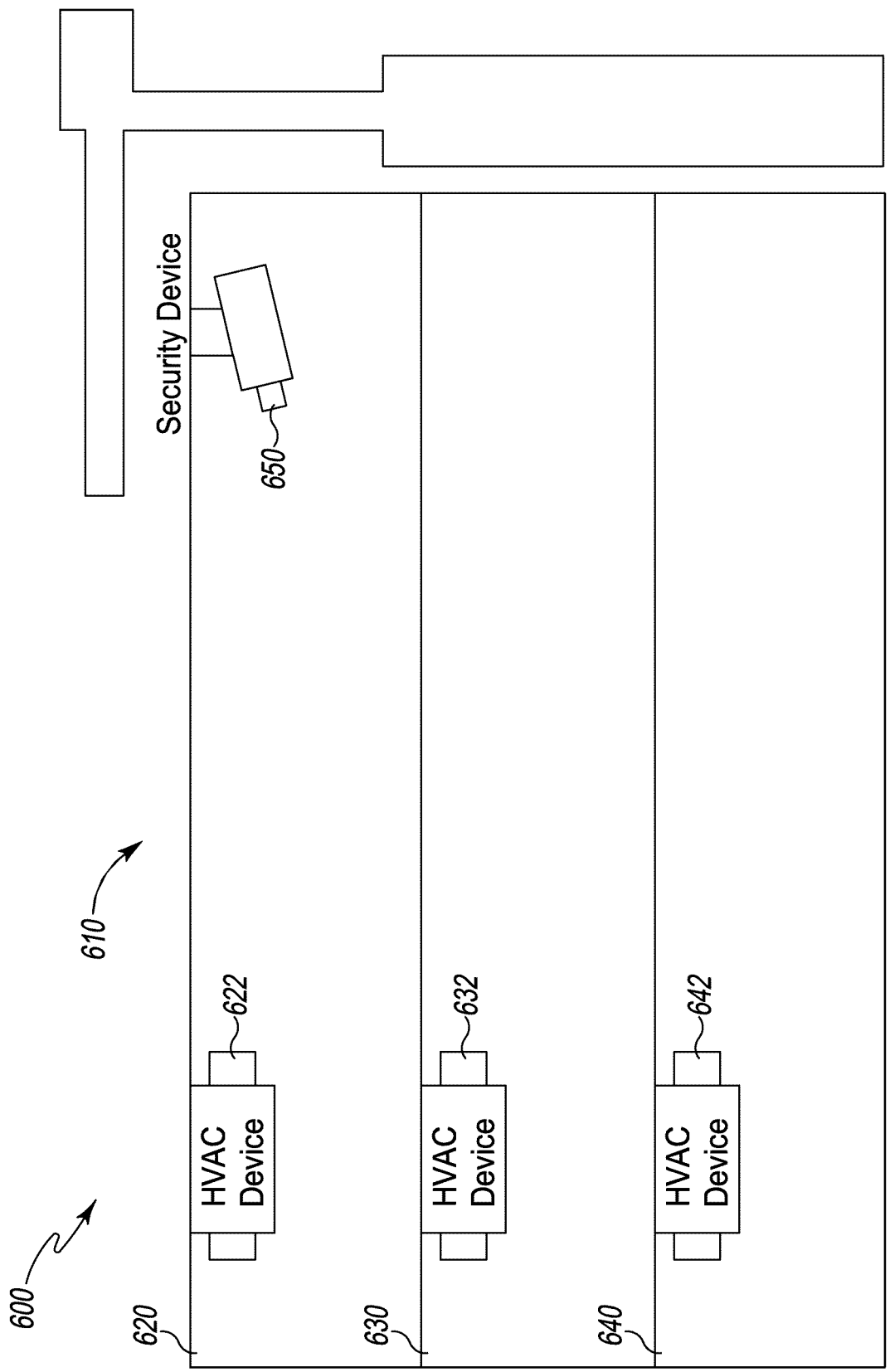
FIG. 6 is a drawing of a building equipped with HVAC devices and a security device, according to some embodiments.
Figure 7A:
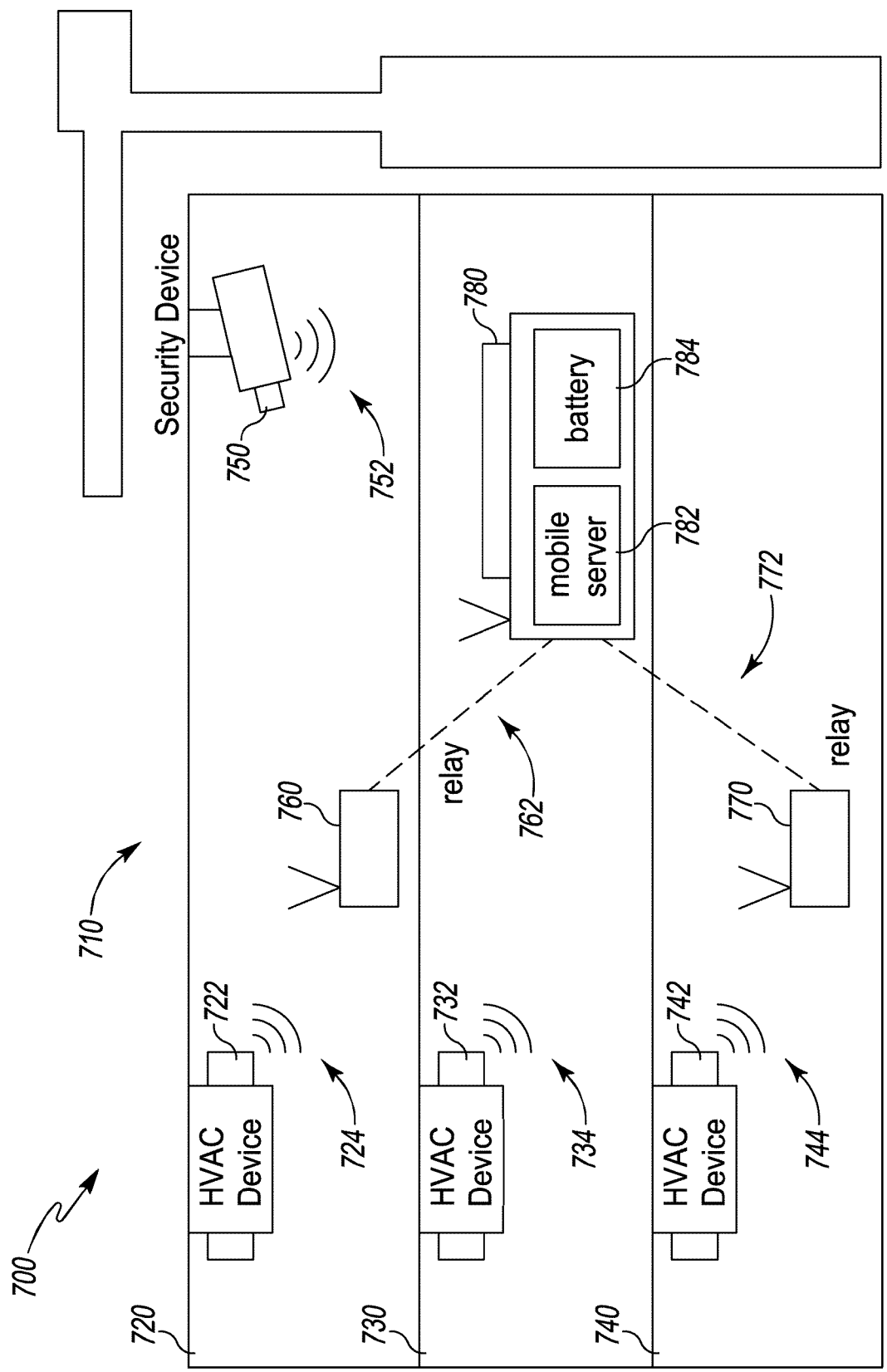
FIG. 7A is a drawing of a building equipped with a system for commissioning HVAC and security devices using a mobile commissioning device, according to some embodiments.
Figure 7B:
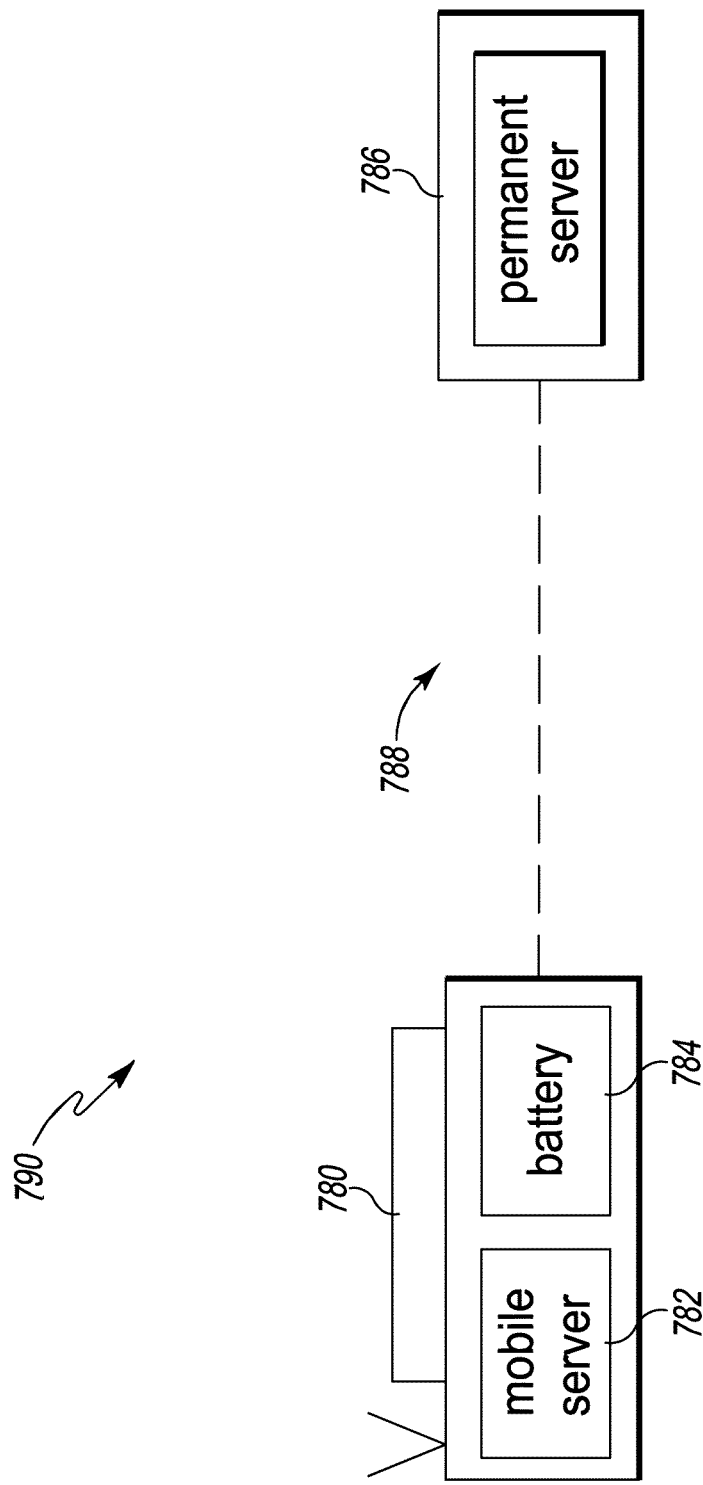
FIG. 7B is a drawing of a mobile commissioning device communicating with a permanent server, according to some embodiments.
Figure 8A:
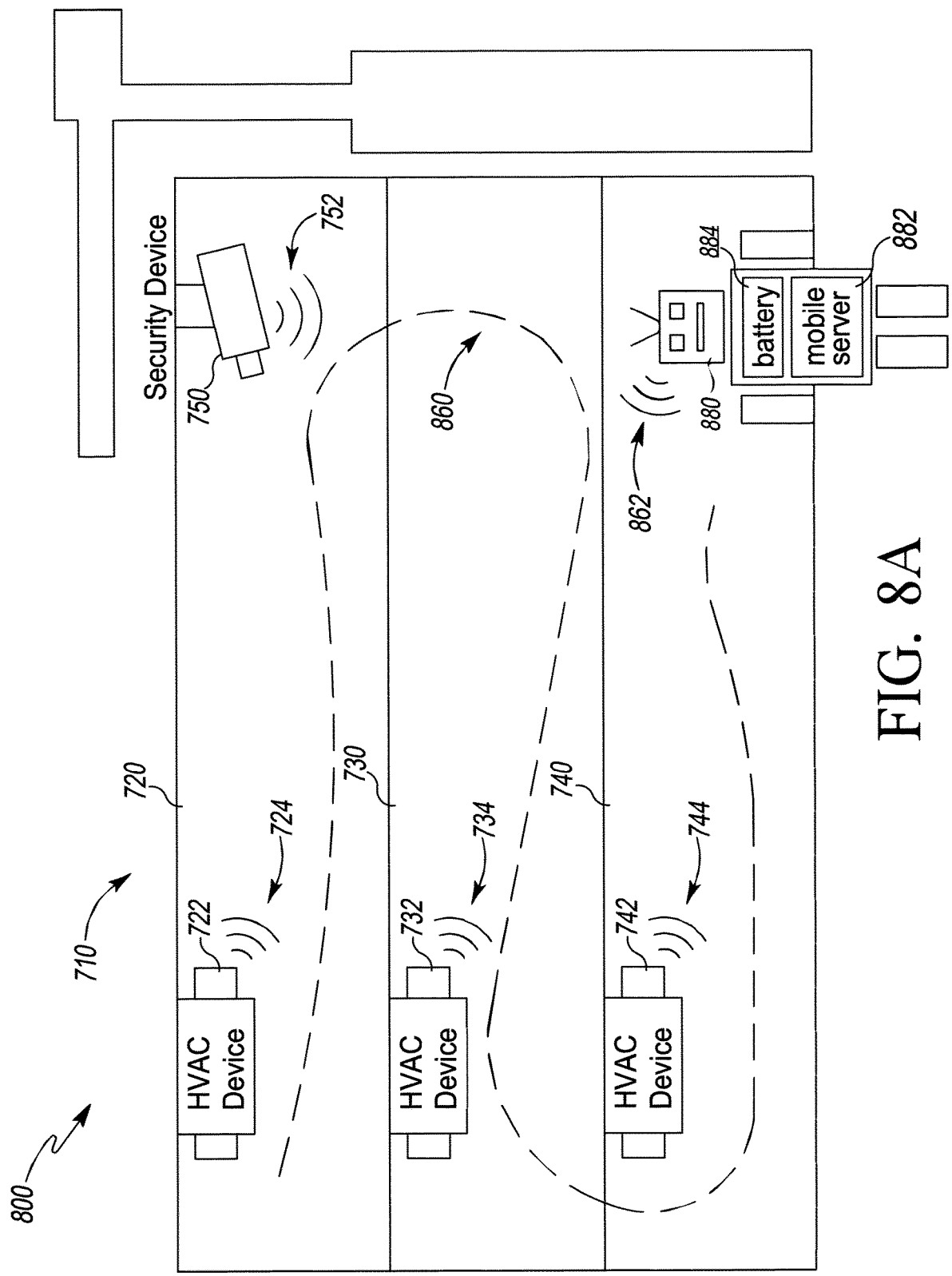
FIG. 8A is a drawing of a building equipped with a system for commissioning HVAC and security devices using an autonomous commissioning device, according to some embodiments.
Figure 8B:
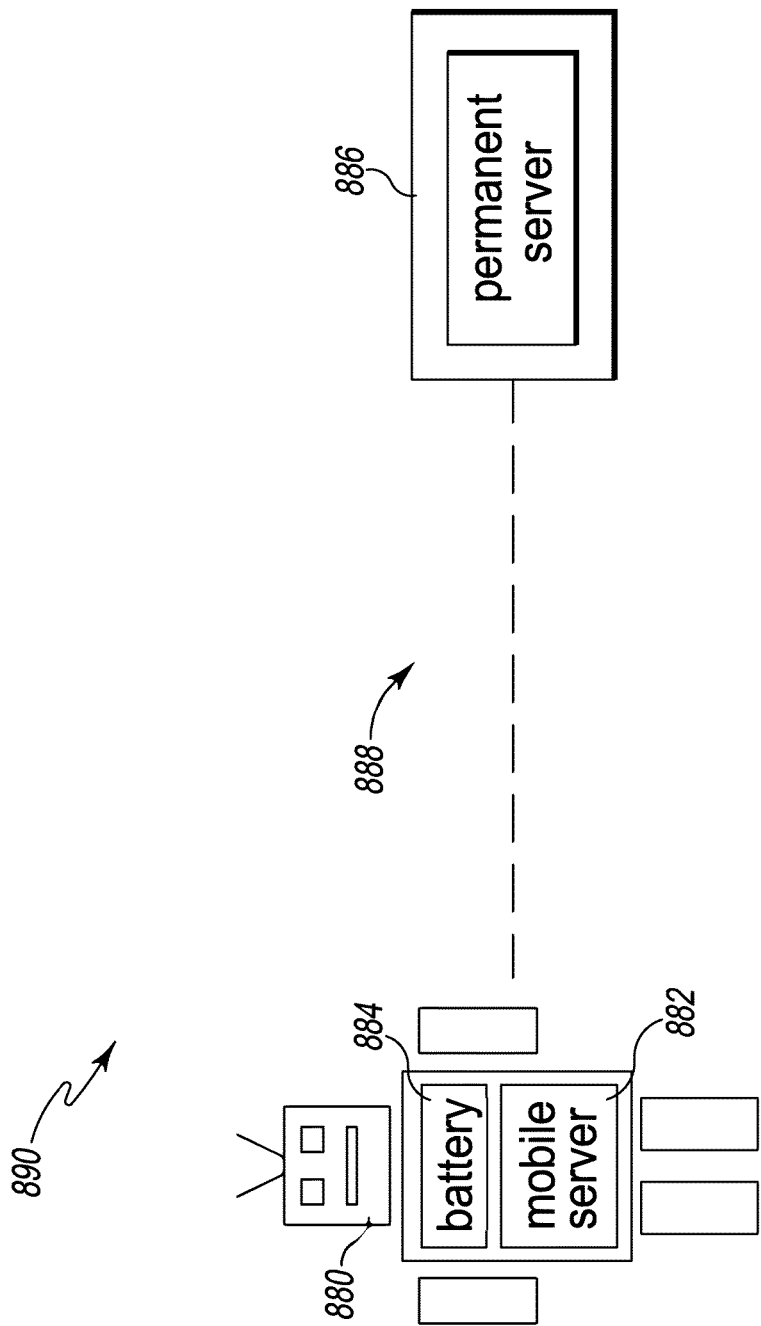
FIG. 8B is a drawing of an autonomous commissioning device communicating with a permanent server, according to some embodiments.
Figure 9:
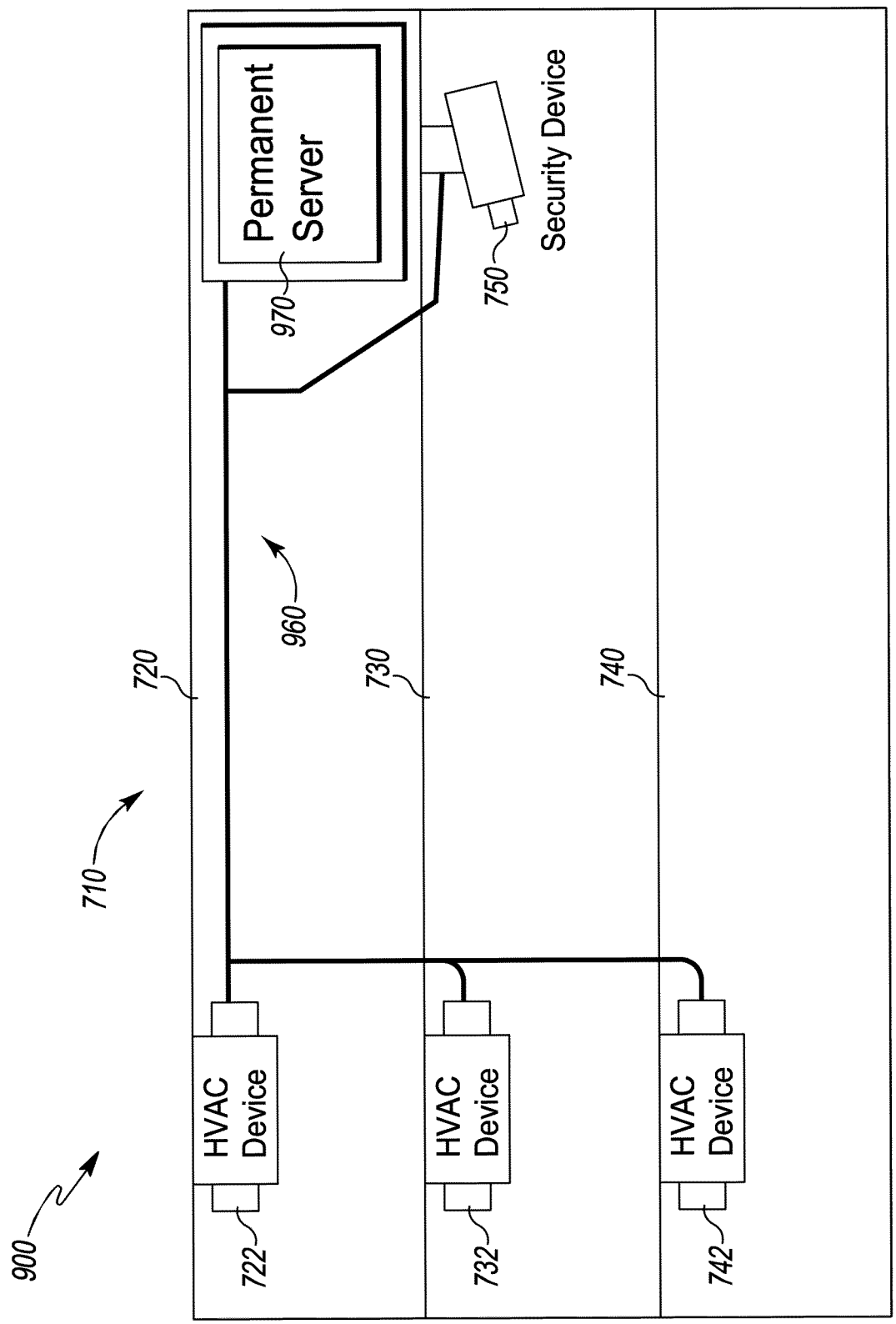
FIG. 9 is a drawing of a building equipped with a permanent server commissioned for and operating in conjunction with HVAC and security devices, according to some embodiments.

Referring now to FIGS. 6-9, several configurations of systems for commissioning HVAC and BAS equipment are shown, according to some embodiments. FIG. 6 is a schematic diagram showing a building that may be under construction that includes HVAC and security devices. FIG. 7A is a schematic diagram showing a building that may be under construction with a system for commissioning HVAC and security devices using a mobile commissioning device. FIG. 7B is a drawing of a mobile commissioning device communicating with a permanent server. FIG. 8A is a drawing of a building with a system for commissioning HVAC and security devices using an autonomous commissioning device. FIG. 8B is a drawing of an autonomous commissioning device communicating with a permanent server. FIG. 9 is a drawing equipped with a permanent server commissioned for and operating in conjunction with HVAC and security devices.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Commissioning Building Equipment

Referring now to FIG. 6, a building system 600 is shown, according to an exemplary embodiment. System 600 can vary by configuration and components, according to some embodiments. In some embodiments, system 600 may be a temporary system used during construction processes at building construction sites. For example, system 600 may be implemented during a construction process for a building site. Further, system 600 can be implemented at various stages during construction processes and can be modified as the construction process progresses. System 600 can also be modified to include additional components as construction processes occur, according to some embodiments.

System 600 is shown to include a building 610. Building 610 can vary by size and configuration. Additionally, building 610 can be under construction, according to some embodiments. In some embodiments, building 610 can be in various stages of construction processes. Further, building 610 can include multiple floors, in which case various equipment may be found on one or all floors. Additionally, building 610 may undergo various construction processes for which system 600 can be adjusted, according to some embodiments. For example, as construction processes take place, building 610 may receive additional components for which system 600 may be adjusted to include.

Building 610 is shown to include an HVAC device 622, which is shown to be located within a zone 620. HVAC device 622 can vary in some embodiments, and in some embodiments may include a group of HVAC devices working in parallel. HVAC device 622 can be located in various places within zone 620. For example, HVAC device 622 can be configured on a floor of zone 620 or can be configured on a ceiling of zone 620. In some embodiments, zone 620 can be a floor of building 610 other than the ground floor. Zone 620 can also be dynamic in that the size, shape, configuration, and contents may change according to construction processes. For example, zone 620 may be expanded as part of construction processes, and as such may accommodate additional equipment such as HVAC device 622, according to some embodiments. As such, such changes to zone 620 during construction processes may allow for adjustment of system 600 in order to provide security for zone 620 and any included equipment such as HVAC device 622 or similar.

Building 610 is shown to include an HVAC device 632, which is shown to be located within a zone 630. HVAC device 632 can, in some embodiments, be the same as or similar to HVAC device 622 while in some embodiments HVAC device 632 can be different than HVAC device 622. Zone 630 can be the same as or similar to zone 620, according to some embodiments, but can also be different from zone 620. For example, zone 630 may be a floor above or below zone 620 and may be configured similar to zone 620. In some embodiments, zone 630 can include HVAC device 632 in the same and/or similar configuration to that of HVAC device 622 and zone 620. HVAC device 632 can, in some embodiments be configured to operate in conjunction with HVAC device 622. As such, the configuration of HVAC device 632 relative to zone 630 and the configuration of HVAC device 622 to zone 620 can may accommodate such operation.

Building 610 is shown to include an HVAC device 642, which is shown to be located within a zone 640. HVAC device 642 can vary in some embodiments, and in some embodiments may be similar to HVAC device 622 and/or HVAC device 632. Further, in some embodiments HVAC device 642 can be different from HVAC device 622 and/or HVAC device 632. Zone 640 can be configured similarly to zone 620 and/or zone 630, according to some embodiments. Zone 640 can also be configured differently than zone 620 and/or zone 630 in some embodiments. For example, zone 640 may be configured such that HVAC device 642 may operative in conjunction with HVAC device 622 of zone 620 or HVAC device 632 of zone 630 in some embodiments. Also similar to zone 620 and zone 630, zone 640 can be dynamic in that the configuration of zone 640 can change subject to construction processes. For example, in some embodiments zone 640 may receive additional HVAC components similar to HVAC device 642 as construction processes occur or may otherwise change configuration in order to accommodate construction processes, according to some embodiments.

Building 610 is shown to include a security device 650. In some embodiments, security device 650 can be configured such that security device 650 can provide security for a large area, for example zone 620, zone 630, and zone 640 of FIG. 6. Security device 650 can be a temporary security device, according to some embodiments, and may be installed as a temporary means of providing security to building 610 and its components while construction processes take place. Further, upon completion of construction of building 610, security device 650 may allow for replacement and/or upgrading, which may increase construction timelines and/or add additional tasks to the construction processes thus delaying completion and subsequent operation of building 610. In some embodiments, security device 650 may be temporary and be repositioned and reconfigured as construction processes progress. For example, changes in configuration of building 610 during the construction process may be grounds for additions and/or modifications of security device 650 which can include repositioning, according to some embodiments.

Referring now to FIG. 7A, a system 700 for commissioning HVAC and security devices with a mobile server 782 is shown, according to an exemplary embodiment. System 700 is shown to include a building 710, according to some embodiments. System 700 can include commissioning a variety of HVAC and security devices and can also include the use of a mobile server in some embodiments. It should be noted that system 700 can include a variety of building equipment and/or data corresponding to a variety of building equipment shown as HVAC and security devices for ease of explanation, according to some embodiments. System 700 can be applied to various building equipment, and is shown in some embodiments. As HVAC and security devices for ease of explanation. System 700 can also be implemented as a temporary system and transition to a permanent system and/or accommodate a transition to a permanent system.

System 700 is shown to include a building 710. Building 710 can have various configurations, according to some embodiments. For example, in some embodiments building 710 may include multiple floors, or building 710 may include a single floor. Additionally, building 710 can be under construction in some embodiments. Further, in the embodiments in which building 710 may be under construction, building 710 may also be subject to changes in configuration as part of various construction processes that may occur. For example, in some embodiments building 710 can receive additional components or assume different footprints over the course of construction processes. As such, building 710 can call for different commissioning for HVAC and security devices of system 700 in some embodiments.

Building 710 is shown to include a zone 720 which is shown to include an HVAC device 722. Zone 720 can be configured to be on a top floor of building 710, according to some embodiments, or can be configured to be on another floor which can include the bottom floor or ground floor. Zone 720 can vary in size, shape, configuration, and contents, and can vary in other factors as well. Additionally, zone 720 can vary according to construction processes. For example, over the course of a construction process, zone 720 can include different components at different times. Further, zone 720 can include equipment necessary to complete construction processes but may also concurrently include equipment such as HVAC device 722.

HVAC device 722 can be similar to HVAC system 100 of FIG. 1, and/or can be similar to a component of HVAC system 100 or similar. In some embodiments, HVAC device 722 can include multiple devices operating concurrently and/or in parallel. In some embodiments, HVAC device 722 can be configured differently within zone 720. For example, depending on the structure of building 710 and the desired operation of HVAC device 722, HVAC device 722 may be positioned and/or repositioned during construction processes so as to both accommodate both construction processes and the desired operations that HVAC device 722 can and/or will perform. In some embodiments, positioning and repositioning HVAC device 722 can cause security concerns with regard to system 700. For example, in order to accommodate construction processes HVAC device 722 may be temporarily moved in order to allow for a construction process to occur, which can necessitate an adjustment to system 700 in order to provide sufficient security services for HVAC device 722. HVAC device 722 can, in some embodiments, be positioned relative to other components of building 710. For example, HVAC device 722 can be positioned within zone 720 in order to accommodate features of building 710 such as water lines, elevator systems, and other possible systems that may be located within building 710. As such, system 700 may adjust to accommodate various configurations of HVAC device 722.

HVAC device 722 is also shown to include a device signal 724. Device signal 724 can be communicated to a relay device 760 or a plurality of devices that may be similar to relay device 760, according to some embodiments. Device signal 724 can be communicated from HVAC device 722 and be received by relay device 760, according to some embodiments. Device signal 724 can serve to communicate various information to relay device 760, which may include information needed for commissioning HVAC device 722. For example, device signal 724 can include information such as the position of HVAC device 722, the location of HVAC device 722 within zone 720 and/or building 710, connection of HVAC device 722 to any relative networks of zone 720 and/or building 710, as well as other information. Relay device 760 can be positioned within zone 720 within building 710, according to some embodiments. In some embodiments, relay device 760 may be positioned elsewhere, such as in another zone within building 710 and/or in another area adjacent to or nearby building 710. For example, relay device 760 may be configured on a different floor of building 710 from HVAC device 722. For example, in some embodiments, relay device 760 may be in communication with other equipment that may be similar to HVAC device 722. In some embodiments, relay device 760 may be in communication with equipment on multiple floors of building 710, or may also be in communication with multiple equipment on a single floor that may be similar to HVAC device 722. In some embodiments relay device 760 can also be in communication with equipment that may be similar to HVAC device 722 that may be configured adjacent to building 710, according to some embodiments.

Relay device 760 is shown to be positioned within zone 720, according to some embodiments. In some embodiments, relay device 760 can be mobile, which is to say that relay device 760 may be of a size and configuration that facilitates movement of relay device 760. Relay device 760 can also be battery powered. In some embodiments, relay device 760 may be located within zone 720, which, in conjunction with building 710, may undergo one or more construction processes. For example, construction processes occurring within zone 720 of building 710 may be circumstances for repositioning of relay device 760 while maintaining communication with equipment such as HVAC device 722 via device signal 724 or similar. Relay device 760 can be configured so as to maintain communication with HVAC device 722 as well as other similar equipment with which relay device 760 may be in communication with while being repositioned. Further, relay device 760 may maintain such communication with HVAC device 722 while being repositioned to another location that may be within zone 720, or another location that may be elsewhere within building 710 or a location adjacent thereof.

Relay device 760 is also shown to be in communication with a commissioning device 780 via a relay signal 762. Relay signal 762 can include commissioning information for one or more devices, such as HVAC device 722 or similar. Commissioning device 780 can be configured to be mobile and easily moveable and can also be located within zone 720 of building 710, or may be elsewhere within building 710, or may be in a location other than building 710 entirely. Commissioning device 780 may also be in communication with one or more relay devices such as relay device 760, and in some embodiments can be in communication with other equipment as well. Further, other equipment that may be in communication with commissioning device 780 may do so via relay signals similar to relay signal 762, or through other means of communication. Further, commissioning device 780 can be connected to and/or in communication with a network or other similar infrastructure that can be installed within building 710. Commissioning device 780 can also be configured such that, depending on ongoing building construction processes of building 710, commissioning device 780 may be moved and/or repositioned which is to say that commissioning device 780 may be of a size and configuration that accommodates repositioning in order to accommodate construction processes.

In some embodiments, commissioning device 780 can be carried or moved throughout a building such as building 710 or other area containing building equipment such as HVAC or security devices that may be commissioned. For example, a user and/or operator may move throughout building 710 with commissioning device 780 such that commissioning device 780 may establish communication with building equipment such as HVAC and security devices. Commissioning device 780 can also be configured to determine its location within a building such as building 710 or other area. In some embodiments, such determination of location may be done through use of one or more GPS signals, altimeters, a triangulation of relay signals, wifi connectivity and parameters, as well as other possible methods. Commissioning device 780 determining its location within a given area can also allow commissioning device 780 to locate various building equipment that may be in the same building or area as commissioning device 780. For example, in the exemplary embodiment of FIG. 7A commissioning device 780 establishes its location within zone 740 of building 710, and upon communication with HVAC device 742 subsequently establishes the location of HVAC device 742 within zone 740 based on the established location of commissioning device 780 and communication there between.

Commissioning device 780 can receive various types of commissioning data from various building equipment such as HVAC devices 722, 732, and 742 as well as security device 750 of FIG. 7A, for example. It should also be noted that commissioning device 780 can receive commissioning data from various different building equipment and is not limited to HVAC devices and security devices such as those shown in exemplary embodiments. Commissioning data that may be received by commissioning device 780 can also include various types of commissioning data which may include, for example, device names, device models, device serial numbers or other identifying characteristics, device types, MAC address, software version, firmware version, equipment model, etc. Commissioning device 780 can be configured to automatically determine location of building equipment such as HVAC devices 722, 732, and 742 within a building such as building 710 based on the location of commissioning device 780 when building devices are detected. Further, commissioning device 780 may establish its location within an area and subsequently establish the location of various building equipment based on the known location of commissioning device 780. For example, if commissioning device 780 establishes its location as within building 710 or possibly a zone thereof, commissioning device 780 can recognize that any building equipment with which communication is established is also within building 710 and/or a zone thereof. That is to say that, in some embodiments commissioning data may not be exclusively data received by commissioning device 780 from various building equipment but may also include commissioning data such as location data generated by commissioning device 780.

Building 710 is shown to include an HVAC device 732 positioned within a zone 730. HVAC device 732 can be similar to, the same as, or different than HVAC device 722 of zone 720. For example, HVAC device 732 may be configured to operate according to zone 730, which may have the same, fewer, additional, and/or different components relative to HVAC device 722. In some embodiments, HVAC device 732 can be configured to operate in conjunction with HVAC device 722 and may also operate in conjunction with other similar components within or adjacent to building 710. Similarly, zone 730 can be the same as, similar to, or different than zone 720. In some embodiments zone 730 can be configured above, below, adjacent to, and/or overlap with zone 720. HVAC device 732 can be positioned within zone 730 so as to optimally perform one or more operations, which may allow for HVAC device 732 to assume one or more positions. Further, HVAC device 732 can be configured to be repositioned within zone 730 as construction processes are carried out. For example, in order for some construction processes to be completed, HVAC device 732 may be repositioned within zone 730 or may be repositioned to another area entirely.

HVAC device 732 can communicate a device signal 734. In some embodiments device signal 734 can be the same as or similar to device signal 724 of HVAC device 722. Device signal 734 can include information needed for commissioning HVAC device 732. In some embodiments, HVAC device 732 can communicate device signal 734 to relay device 760, or other similar relay devices. In some embodiments, HVAC device 732 can be in communication with a relay device such as relay device 760 that may be positioned within zone 730, or that may be positioned within another area and/or zone of or adjacent to building 710. Further, communication of device signal 734 can be received by one or more relay devices such as relay device 760. Additionally, reception of device signal 734 from HVAC device 732 can communicate information the same as or similar to that communicated by HVAC device 722. Further, in some embodiments HVAC device 722 and HVAC device 732 may operate in conjunction and as such both device signal 724 and device signal 734 can include information regarding cooperation of HVAC device 722 and HVAC device 732. Upon receiving device signal 734 or similar, relay device 760 and/or similar can, in some embodiments, communicate information of device signal 734 to commissioning device 780 or similar.

Building 710 is shown to include a zone 740 which includes an HVAC device 742. HVAC device 742 can be the same as and/or similar to HVAC device 722 and/or HVAC device 732. HVAC device 742 can communicate a device signal 744, which can be similar to and/or the same as device signal 724 and/or device signal 734 and may include information needed for commissioning HVAC device 742. Further, HVAC device 742 can be configured to work cooperatively with HVAC device 722 and/or HVAC device 732, according to some embodiments. In some embodiments, zone 740 may be the same as or similar to zone 720 and/or zone 730. Further, zone 740 may be positioned above, below, adjacent to and/or overlapping with zone 720 and/or zone 730. Additionally, zone 740 can be configured to be the same as, similar to, or different than zone 720 and/or zone 730 in terms of layout, size, and shape as well as any construction processes that may be conducted therein. Zone 740 is also shown to include a relay device 770. In some embodiments, relay device 770 may be the same and/or similar to relay device 760. Similar to relay device 760, relay device 770 can be battery powered and also configured such that it may be repositioned within zone 740 and/or other similar and/or adjacent areas. Relay device 770 can also communicate with commissioning device 780 using the same and/or similar methods and techniques to those implemented by relay device 760. In the embodiment of FIG. 7A, relay device 770 is shown to communicate a relay signal 772 to commissioning device 780. In some embodiments, relay device 770 may communicate information to commissioning device 780 via relay signal 772. Further, information communicated from relay device 770 to commissioning device 780 via relay signal 772 can be similar to that communicated by relay device 760 via relay signal 762. Relay signal 772 can include information for commissioning one or more devices such as HVAC device 742 or similar. In some embodiments such information can pertain to HVAC equipment such as HVAC device 722, HVAC device 732, and HVAC device 742 and may include device location, device specifications, and indications of device presence/operation, as well as other information.

Building 710 is shown to include a security device 750. Security device 750 can be located in a specific building zone, such as zone 720 as shown in the embodiment of FIG. 7A or can be configured such that security device 750 may provide security for multiple zones. In some embodiments, building 710 may include multiple security devices. Further, in embodiments including multiple security devices the same as or similar to security device 750, security devices may provide overlapping coverage for various zones in order to ensure coverage for all desired areas. Security device 750 can include motion sensors or a variety of cameras as well as other possible security devices. Further, security device 750 can, in some embodiments, be a component of a larger security system which may provide security coverage for multiple zones within a single building such as building 710 or may also provide coverage for multiple buildings. Security device 750 can also be configured such that it may be implemented as a temporary system in the midst of ongoing building construction processes. As such, in some embodiments security device 750 can also be configured to be easily repositioned in order to accommodate ongoing building construction processes while still providing security coverage for desired areas of building 710.

Security device 750 is shown to communicate information via a security signal 752. Security signal 752 can be communicated to a commissioning device such as commissioning device 780, as well as other possible devices. In some embodiments, information communicated by security signal 752 may be received by more than one commissioning device such as commissioning device 780. Security device 750 can also be configured to be connected to other devices within building 710, devices for which security device 750 may provide security coverage, as well as other possible security devices configured to work in parallel or in conjunction with security device 750. Security device 750 can also be configured to communicate with security monitoring equipment. Further, in some embodiments the information communicated by security device 750 via security signal 752 may include connection status with one or more HVAC devices such as HVAC device 722, HVAC device 732, and/or HVAC device 742, security breaches or threats that have been identified, and indications of ongoing security coverage as well as other possible information. Security signal 752 can also be received by relay devices such as relay device 760 and/or relay device 770. In some embodiments, security signal 752 may be received by multiple components, such as one or more relay devices including relay device 760 and/or relay device 770 or similar as well as commissioning device 780 or similar.

Commissioning device 780 is shown to include a mobile server 782 and a battery 784. In some embodiments, commissioning device 780 may include multiple mobile servers such as mobile server 782 or similar and may also include multiple batteries such as battery 784 or similar. In some embodiments, multiple commissioning devices such as commissioning device 780 can be located within building 710 and/or multiple buildings. In some embodiments, multiple commissioning devices such as commissioning device 780 may be configured to communicate with each other, as well as other devices such as relay device 760 and relay device 770 or similar, as well as security device 750 or similar. Mobile server 782 of commissioning device 780 can be configured to receive relay signal 762 and relay signal 772 from relay device 760 and relay device 770, respectively, or other similar relay devices. Further, mobile server 782 may also be configured to receive security signal 752 from security device 750. Mobile server 782 can also be configured to receive signals from other devices that may be located within or adjacent to building 710, which may include signals from other commissioning devices the same as or similar to commissioning device 780 as well as other systems that may be used in conjunction with commissioning device 780 in order to commission equipment within or adjacent to building 710.

Referring now to FIG. 7B, a system 790 for data transfer between a commissioning device 780 and a permanent server 786 is shown, according to an exemplary embodiment. It should be noted that system 790 can include a variety of building equipment and/or data corresponding to a variety of building equipment shown as HVAC and security devices for ease of explanation, according to some embodiments. System 790 is shown to include commissioning device 780, which can be the same as and/or similar to that shown in FIG. 7A, according to some embodiments. Further, commissioning device 780 is shown to include mobile server 782 and battery 784 as does commissioning device 780 in the embodiment of FIG. 7A. System 790 is also shown to include a permanent server 786. Permanent server 786 can be located within building 710 or similar and may be installed within building 710 upon completion of construction processes. Commissioning device 780 is shown to communicate a transfer signal 788 to permanent server 786. In some embodiments, permanent server 786 can both receive transfer signal 788 from commissioning device 780 and also communicate information to commissioning device 780. Transfer signal 788 can include databases including configuration for HVAC and security devices established and constructed by commissioning device 780, which may then be transferred to permanent server 786 in order to eliminate the need for commissioning security and HVAC devices upon the installation of permanent server 786. For example, in some embodiments commissioning device 780 can communicate information received by one or more relay devices such as relay device 760 and/or relay device 770 or similar, which can include information received from HVAC device 722, HVAC device 732 and/or HVAC device 742. Further, information communicated as such may include information specific to one or more HVAC devices, information pertaining to and/or from security device 750 or similar, as well as other possible information.

Permanent server 786 can be larger and may be configured to operate differently than commissioning device 780. In some embodiments, permanent server 786 may be configured to perform more functions than mobile server 782 of commissioning device 780. In some embodiments, permanent server 786 can be configured to be permanently positioned within building 710 and may be the only such piece of equipment within building 710 or may be one of multiple such pieces of equipment within building 710. Permanent server 786 may be configured by commissioning device 780 to be in communication with one or more components of building 710, which may include HVAC device 722, HVAC device 732, HVAC device 742, as well as security device 750. In some embodiments, permanent server 786 can also be in communication with other equipment which may include equipment similar to or the same as permanent server 786. Permanent server 786 can also be configured to be permanently installed within building 710 or similar upon the completion of construction processes. In some embodiments, permanent server 786 is not battery powered as commissioning device 780 is but may use power and as such can only be installed when once final wiring has been completed as part of construction processes. When permanent server 786 is installed, HVAC devices such as HVAC device 722, HVAC device 732 and HVAC device 742 as well as security devices such as security device 750 (all of FIG. 7A) can be configured to already be commissioned to operate in conjunction with permanent server 786. That is to say that the commissioning done by commissioning device 780 eliminates the need for devices of building 710 to be commissioned for permanent server 786, as transfer signal 788 allows for the transfer of necessary databases and other information from commissioning device 780 to permanent server 786 thus allowing for immediate operation upon installation of permanent server 786.

Referring now to FIG. 8A, a system 800 for commissioning HVAC and security devices with an autonomous commissioning device 880 (e.g., a robot or drone) is shown, according to an exemplary embodiment. System 800 is shown to include building 710, according to some embodiments. System 800 can include commissioning a variety of building devices, which are shown in some embodiments as HVAC and security devices for ease of explanation. System 800 can further include the use of a mobile server in some embodiments. System 800 can also be implemented as a temporary system and transition to a permanent system and/or accommodate a transition to a permanent system.

Building 710 can be the same as or similar to building 710 of FIG. 7A, and can have various configurations, according to some embodiments. For example, in some embodiments building 710 may include multiple floors, or building 710 may include a single floor. Additionally, building 710 can be under construction in some embodiments. Further, in the embodiments in which building 710 may be under construction, building 710 may also be subject to changes in configuration as part of various construction processes that may occur. For example, in some embodiments building 710 can receive additional components or assume different footprints over the course of construction processes. As such, building 710 can use different commissioning for HVAC and security devices of system 800 in some embodiments.

Building 710 is shown to include zone 720 which is shown to include HVAC device 722. Zone 720 can be configured to be on a top floor of building 710, according to some embodiments, or can be configured to be on another floor which can include the bottom floor or ground floor. Zone 720 can vary in size, shape, configuration, and contents, and can vary in other factors as well. Additionally, zone 720 can very according to construction processes. For example, over the course of a construction process, zone 720 can include different components at different times. Further, zone 720 can include equipment necessary to complete construction processes but may also concurrently include equipment such as HVAC device 722.

HVAC device 722 can be similar to HVAC system 100 of FIG. 1, and/or can be similar to a component of HVAC system 100 or similar. In some embodiments, HVAC device 722 can include multiple devices operating concurrently and/or in parallel. In some embodiments, HVAC device 722 can be configured differently within zone 720. For example, depending on the structure of building 710 and the desired operation of HVAC device 722, HVAC device 722 may be positioned and/or repositioned during construction processes so as to both accommodate both construction processes and the desired operations that HVAC device 722 can and/or will perform. In some embodiments, positioning and repositioning HVAC device 722 can cause security concerns with regard to system 800. For example, in order to accommodate construction processes HVAC device 722 may be temporarily moved in order to allow for a construction process to occur, which can necessitate an adjustment to system 800 in order to provide sufficient security services for HVAC device 722. HVAC device 722 can, in some embodiments, be positioned relative to other components of building 710. For example, HVAC device 722 can be positioned within zone 720 in order to accommodate features of building 710 such as water lines, elevator systems, and other possible systems that may be located within building 710. As such, system 800 may adjust to accommodate various configurations of HVAC device 722.

HVAC device 722 is also shown to include device signal 724. Device signal 724 can be communicated to an autonomous commissioning device 880 or a plurality of devices that may be similar to autonomous commissioning device 880, according to some embodiments. Device signal 724 can be the same as and/or similar to that of FIG. 7A. Autonomous commissioning device 880 can, in some embodiments, perform operations similar to those of commissioning device 780 of FIG. 7A. Device signal 724 can be communicated from HVAC device 722 and be received by autonomous commissioning device 880, according to some embodiments. Device signal 724 can serve to communicate various information to autonomous commissioning device 880, which may include information needed for commissioning HVAC device 722. For example, device signal 724 can include information including the position of HVAC device 722, the location of HVAC device 722 within zone 720 and/or building 710, connection of HVAC device 722 to any relative networks of zone 720 and/or building 710, as well as other information. Autonomous commissioning device 880 can be configured to move throughout building 710 along a path 860, according to some embodiments. Path 860 may be predetermined by a user and/or operator of autonomous commissioning device 880. In some embodiments, autonomous commissioning device 880 may travel along alternate paths or may be configured to move in certain areas or avoid certain areas based on ongoing construction processes or other events with which movement of autonomous commissioning device 880 may interfere. For example, autonomous commissioning device 880 may be configured to move along a desired path the same as or similar to path 860 that has been configured such that autonomous commissioning device 880 may be in close enough proximity to HVAC devices such as HVAC device 722 in order to receive a signal such as device signal 724. Further, autonomous commissioning device 880 can be in communication with HVAC device 722 as well as other equipment the same as and/or similar to HVAC device 722. In some embodiments, autonomous commissioning device 880 may be in communication with equipment on multiple floors of building 710 or may also be in communication with multiple equipment on a single floor that may be similar to HVAC device 722. In some embodiments autonomous commissioning device 880 can also be in communication with equipment that may be similar to HVAC device 722 that may be configured adjacent to building 710.

Building 710 is shown to include HVAC device 732 positioned within zone 730. HVAC device 732 can be similar to, the same as, or different than HVAC device 722 of zone 720. For example, HVAC device 732 may be configured to operate according to zone 730, which may use the same, fewer, additional, and/or different components relative to HVAC device 722. In some embodiments, HVAC device 732 can be configured to operate in conjunction with HVAC device 722 and may also operate in conjunction with other similar components within or adjacent to building 710. Similarly, zone 730 can be the same as, similar to, or different than zone 720. In some embodiments zone 730 can be configured above, below, adjacent to, and/or overlap with zone 720. HVAC device 732 can be positioned within zone 730 so as to optimally perform one or more operations, which may allow HVAC device 732 to assume one or more positions. Further, HVAC device 732 can be configured to be repositioned within zone 730 as construction processes are carried out. For example, in order for some construction processes to be completed, HVAC device 732 may be repositioned within zone 730 or may be repositioned to another area entirely.

HVAC device 732 can communicate device signal 734. In some embodiments device signal 734 can be the same as or similar to device signal 724 of HVAC device 722. Device signal 734 can include information needed for commissioning HVAC device 732. In some embodiments, HVAC device 732 can communicate device signal 734 to autonomous commissioning device 880, or other similar devices. In some embodiments, HVAC device 732 can be in communication with autonomous commissioning device 880 that may be positioned within zone 730, or that may be positioned within another area and/or zone of or adjacent to building 710. In some embodiments, path 860 may be configured to pass through zone 720 and/or zone 730. Device signal 734 communicated by HVAC device 732 to one or more autonomous commissioning devices such as autonomous commissioning device 880 or similar, according to some embodiments. Further, communication of device signal 734 can be received by one or more relay devices such as autonomous commissioning device 880. Additionally, reception of device signal 734 from HVAC device 732 can communicate information the same as or similar to that communicated by HVAC device 722. Further, in some embodiments HVAC device 722 and HVAC device 732 may operate in conjunction and as such both device signal 724 and device signal 734 can include information regarding cooperation of HVAC device 722 and HVAC device 732. Upon receiving device signal 734 or similar, autonomous commissioning device 880 and/or similar can, in some embodiments, communicate information of device signal 734 to autonomous commissioning device 880 or similar.

Building 710 is shown to include zone 740 which includes HVAC device 742. HVAC device 742 can be the same as and/or similar to HVAC device 722 and/or HVAC device 732. HVAC device 742 can communicate device signal 744, which can be similar to and/or the same as device signal 724 and/or device signal 734 and may include information needed for commissioning HVAC device 742. Further, HVAC device 742 can be configured to work cooperatively with HVAC device 722 and/or HVAC device 732, according to some embodiments. In some embodiments, zone 740 may be the same as or similar to zone 720 and/or zone 730. Further, zone 740 may be positioned above, below, adjacent to and/or overlapping with zone 720 and/or zone 730. Additionally, zone 740 can be configured to be the same as, similar to, or different than zone 720 and/or zone 730 in terms of layout, size, and shape as well as any construction processes that may be conducted therein. Zone 740 is also shown to include path 860 on which autonomous commissioning device 880 can be configured to travel. In some embodiments, autonomous commissioning device 880 may be configured to travel within proximity to HVAC device 742 in order to receive device signal 744. Device signal 744 can include information for commissioning one or more devices such as HVAC device 742 or similar. In some embodiments such information can pertain to HVAC equipment such as HVAC device 722, HVAC device 732, and HVAC device 742 and may include device location, device specifications, and indications of device presence/operation, as well as other information.

Building 710 is shown to include security device 750. Security device 750 can be located in a specific building zone, such as zone 720 as shown in the embodiment of FIG. 8A or can be configured such that security device 750 may provide security for multiple zones. In some embodiments, building 710 may include multiple security devices. Further, in embodiments including multiple security devices the same as or similar to security device 750, security devices may provide overlapping coverage for various zones in order to ensure coverage for all desired areas. Security device 750 can include motion sensors or a variety of cameras as well as other possible security devices. Further, security device 750 can, in some embodiments, be a component of a larger security system which may provide security coverage for multiple zones within a single building such as building 710 or may also provide coverage for multiple buildings. Security device 750 can also be configured such that it may be implemented as a temporary system in the midst of ongoing building construction processes. As such, in some embodiments security device 750 can also be configured to be easily repositioned in order to accommodate ongoing building construction processes while still providing security coverage for desired areas of building 710.

Security device 750 is shown to communicate information via a security signal 852. Security signal 852 can be communicated to a commissioning device such as autonomous commissioning device 880, as well as other possible devices. In some embodiments, information communicated by security signal 852 may be received by more than one commissioning device such as autonomous commissioning device 880. Security device 750 can also be configured to be connected to other devices within building 710, devices for which security device 750 may provide security coverage, as well as other possible security devices configured to work in parallel or in conjunction with security device 750. Security device 750 can also be configured to communicate with security monitoring equipment. Further, in some embodiments the information communicated by security device 750 via security signal 852 may include connection status with one or more HVAC devices such as HVAC device 722, HVAC device 732, and/or HVAC device 742, security breaches or threats that have been identified, and indications of ongoing security coverage as well as other possible information. In some embodiments, security signal 852 may be received by multiple components, such as one or more commissioning devices including autonomous commissioning device 880 and/or similar.

Autonomous commissioning device 880 is shown to include a mobile server 882 and a battery 884. In some embodiments, autonomous commissioning device 880 may include multiple mobile servers such as mobile server 882 or similar and may also include multiple batteries such as battery 884 or similar. Autonomous commissioning device 880 can also produce an autonomous commissioning device signal 862 which can be received by equipment operating within building 710 as well as other equipment operating within close proximity to building 710. For example, autonomous commissioning device signal 878 may be communicated to and received by HVAC device 722, HVAC device 732, HVAC device 742, and security device 750, as well as other possible equipment such as equipment similar to autonomous commissioning device 880. In some embodiments, multiple commissioning devices such as autonomous commissioning device 880 can be implemented within building 710 and/or multiple buildings. In some embodiments, multiple commissioning devices such as autonomous commissioning device 880 may be configured to communicate with each other, as well as other devices such as security device 750 or similar. Mobile server 882 of autonomous commissioning device 880 can be configured to receive device signal 724, device signal 734 and device signal 744 from HVAC device 722, HVAC device 732, and HVAC device 742 respectively, or other similar relay devices. Further, mobile server 882 may also be configured to receive security signal 852 from security device 750. Mobile server 882 can also be configured to receive signals from other devices that may be located within or adjacent to building 710, which may include signals from other commissioning devices the same as or similar to autonomous commissioning device 880 as well as other systems that may be used in conjunction with autonomous commissioning device 880 in order to commission equipment within or adjacent to building 710.

Autonomous commissioning device 880 is shown to operate differently than commissioning device 780 of FIGS. 7A-B. Commissioning device 780 relies on relay devices such as relay device 760 and relay device 770, as well as relay signal 762 and relay signal 772, according to some embodiments. Autonomous commissioning device 880 is configured to move independently within building 710 and any zones thereof so as to be in close enough proximity to receive communication from devices such as HVAC device 722, HVAC device 732, and HVAC device 742 as well as other components including security device 750, according to some embodiments. Autonomous commissioning device 880 can, in some embodiments, be configured to self-commission an entire area or building. Further, autonomous commissioning device 880 can be configured to follow a path such as path 860 in order to receive the best wireless signal from equipment that use commissioning such as HVAC devices and security devices the same as and or similar to those shown in FIG. 8A. Autonomous commissioning device 880 may also be configured to operate autonomously. For example, in some embodiments autonomous commissioning device 880 can be configured to follow a predetermined path within a building or a specified area, while in other embodiments autonomous commissioning device 880 may be configured to move autonomously in order to gain necessary information from devices requiring commissioning. Autonomous commissioning device 880 can also move within a limited area, which can be desirable if ongoing construction processes are occurring while autonomous commissioning device 880 is performing commissioning operations. For example, if a construction process is actively occurring in a specific area of building 710, autonomous commissioning device 880 may be configured so as to avoid that area when moving and performing commissioning operations.

Referring now to FIG. 8B, a system 890 for data transfer between an autonomous commissioning device and a permanent server is shown, according to an exemplary embodiment. It should be noted that system 890 can include a variety of building equipment and/or data corresponding to a variety of building equipment shown as HVAC and security devices for ease of explanation, according to some embodiments. System 890 is shown to include autonomous commissioning device 880, which can be the same as and/or similar to that shown in FIG. 8A. Further, autonomous commissioning device 880 is shown to include mobile server 882 and battery 884 as does autonomous commissioning device 880 in the embodiment of FIG. 8A. System 890 is also shown to include a permanent server 886, which can be the same or similar to permanent server 786 of FIG. 7B. Permanent server 886 can be located within building 710 or similar and may be installed within building 710 upon completion of construction processes. Autonomous commissioning device 880 is shown to communicate a transfer signal 888 to permanent server 886. In some embodiments, permanent server 886 can both receive transfer signal 888 from autonomous commissioning device 880 and also communicate information to autonomous commissioning device 880. Transfer signal 888 can include databases including configuration for HVAC and security devices established and constructed by commissioning device 780, which may then be transferred to permanent server 886 in order to eliminate the need for commissioning security and HVAC devices upon the installation of permanent server 886. For example, in some embodiments autonomous commissioning device 880 can communicate information received by one or more device signals such as device signal 724, device signal 734, and/or device signal 744 or similar, which can include information received from HVAC device 722, HVAC device 732 and/or HVAC device 742, respectively, as shown in FIG. 8A. Further, information communicated as such may include information specific to one or more HVAC devices, information pertaining to and/or from security device 750 or similar, as well as other possible information.

Permanent server 886 can be larger and may be configured to operate differently than autonomous commissioning device 880. In some embodiments, permanent server 886 may be configured to perform more functions than mobile server 882 of autonomous commissioning device 880. In some embodiments, permanent server 886 can be configured to be permanently positioned within building 710 and may be the only such piece of equipment within building 710 or may be one of multiple such pieces of equipment within building 710. Permanent server 886 may be configured by autonomous commissioning device 880 to be in communication with one or more components of building 710, which may include HVAC device 722, HVAC device 732, HVAC device 742, as well as security device 750. In some embodiments, permanent server 886 can also be in communication with other equipment which may include equipment similar to or the same as permanent server 886. Permanent server 886 can also be configured to be permanently installed within building 710 or similar upon the completion of construction processes. In some embodiments, permanent server 886 is not battery powered as autonomous commissioning device 880 is but uses power and as such can only be installed when once final wiring has been completed as part of construction processes. When permanent server 886 is installed, HVAC devices such as HVAC device 722, HVAC device 732 and HVAC device 742 as well as security devices such as security device 750 (all of FIG. 7A) can be configured to already be commissioned to operate in conjunction with permanent server 886. That is to say that the commissioning done by autonomous commissioning device 880 eliminates the need for devices of building 710 to be commissioned for permanent server 886, as transfer signal 888 allows for the transfer of necessary databases and other information from autonomous commissioning device 880 to permanent server 886 thus allowing for immediate operation upon installation of permanent server 886.

Referring now to FIG. 9, a system 900 for secure building operation is shown, according to an exemplary embodiment. System 900 can vary by configuration and components, according to some embodiments. It should be noted that system 900 can include a variety of building equipment which may be shown as HVAC and security devices in some embodiments for ease of explanation. In some embodiments, system 900 can be permanent and installed once construction processes for a building have been completed. For example, in some embodiments system 900 may be installed once a building has had the final wiring process complete. Further, system 900 can be installed so as to operate in conjunction with other permanently installed equipment, which can include HVAC devices and security devices as well as other possible devices.

System 900 is shown to include building 710. Building 710 can be the same as or similar to building 710 of FIG. 7A and FIG. 8A, and is shown to include HVAC device 722, which is shown to be located within zone 720. HVAC device 722 can vary in some embodiments, and in some embodiments may include a group of HVAC devices working in parallel. HVAC device 722 can be located in various places within zone 720. For example, HVAC device 722 can be configured on a floor of zone 720 or can be configured on a ceiling of zone 720. In some embodiments, zone 720 can be a floor of building 710 other than the ground floor. Zone 720 can also be a completed portion of building 710 and/or building 710 may be completed in its entirety. Further, zone 720 may, in some embodiments, have had final wiring installed so as to accommodate HVAC device 722.

Building 710 is shown to include HVAC device 722, which is shown to be located within zone 730. Zone 730 can be the same as or similar to zone 720, according to some embodiments, but can also be different from zone 720. For example, zone 730 may be a floor above or below zone 720 and may be configured similarly to zone 720. In some embodiments, zone 730 can include HVAC device 732 in the same and/or similar configuration to that of HVAC device 722 and zone 720. HVAC device 732 can, in some embodiments be configured to operate in conjunction with HVAC device 722. As such, the configuration of HVAC device 722 relative to zone 730 and the configuration of HVAC device 722 to zone 720 can may accommodate such operation.

Building 710 is shown to include HVAC device 742, which is shown to be located within zone 740. HVAC device 742 can vary in some embodiments, and in some embodiments may be similar to HVAC device 722 and/or HVAC device 732. Further, in some embodiments HVAC device 742 can be different from HVAC device 722 and/or HVAC device 732. Zone 740 can be configured similar to zone 720 and/or zone 730, according to some embodiments. Zone 740 can also be configured to differently that zone 720 and/or zone 730 in some embodiments. For example, zone 740 may be configured such that HVAC device 742 may operative in conjunction with HVAC device 722 of zone 720 or HVAC device 732 of zone 730, in some embodiments.

Building 710 is shown to include security device 750. In some embodiments, security device 750 can be configured such that security device 750 can provide security for a large area, for example zone 720, zone 730, and zone 740 of FIG. 9. Security device 750 can be installed as a permanent security device configured to provide security coverage to one or more areas of building 710. Further, security device 750 may rely upon completed final wiring 960 that has been installed within building 710. As such, security device 750 may be connected to and in communication with HVAC device 722, HVAC device 732, and HVAC device 742 as well as other possible devices via final wiring 960. Subsequently, these devices can also be in communication and connected to a permanent server 970. Final wiring 960 can span multiple zones of building 710 as well as span all of building 710, according to some embodiments. In some embodiments, final wiring 960 can be implemented in order to power, connect, and operate components of system 900 including HVAC devices, security devices, and permanent servers, as well as other possible devices that may be included within system 900.

In some embodiments, permanent server 970 can be the same as and/or similar to permanent server 786 of FIG. 7B and permanent server 886 of FIG. 8B. Permanent server 970 can also rely on final wiring 960 in order to operate in conjunction with other devices within building 710 including those shown in FIG. 9. Permanent server 970 may have also received database information as well as other relevant information from one or more commissioning devices, which may include commissioning device 780 of FIGS. 7A-B and/or autonomous commissioning device 880 of FIGS. 8A-B. Permanent server 970 can, in some embodiments, be installed within finished building 710 and not use any commissioning of devices with which it is connected, as commissioning processes may have been completed by commissioning device 780 of FIGS. 7A-B and/or autonomous commissioning device 880 of FIGS. 8A-B.

Mobile Sensing Systems

Figure 10:
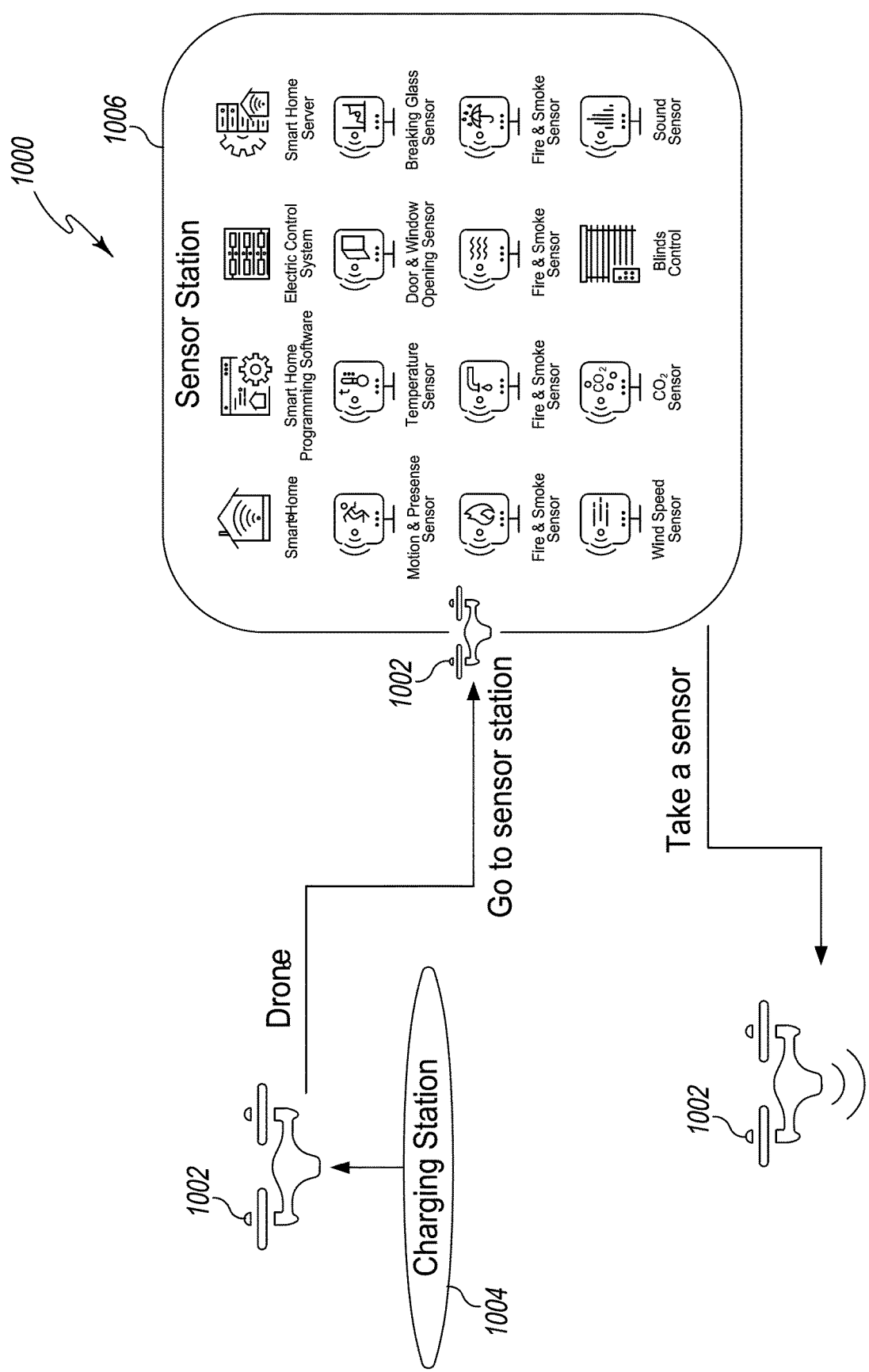
FIG. 10 is a schematic diagram of a mobile sensing system which can be used to adjust and reposition sensors, according to some embodiments.

Referring now to FIG. 10, a mobile sensing system 1000 is shown, according to some embodiments. System 1000 may be implemented within a building, for example building 10 as shown and described previously, or may be implemented in conjunction with one or more buildings (e.g., a campus, etc.). Additionally, system 1000 may be implemented for other facilities, for example a job site or other similar area in which one or more sensors may be places. System 1000 may also include various sensors and/or building equipment, for example building equipment shown and described previously (e.g., the building equipment of building 10 of FIG. 1).

System 1000 is shown to include a drone 1002 as shown in the exemplary embodiment of FIG. 10, according to some embodiments. Drone 1002 can be configured to be rechargeably-operated, and accordingly system 1000 includes a charging station 1004 as shown in FIG. 10. In some embodiments, drone 1002 may be battery-powered or include other rechargeable power and/or power systems. Charging station 1004 may be configured within building 10, for example, or may be configured otherwise such that drone 1002 may travel away from and return to charging station 1004. For example, charging station 1004 may be positioned adjacent building 10 such that drone 1002 may travel into and out of building 10 as well as around the perimeter thereof. Drone 1002 may include one or more components configured to communicate with one or more systems within building 10, for example via a cloud and/or other components such as those shown and described with reference to FIGS. 1-5 (e.g., network 446, etc.). Drone 1002 may be configured to travel about an area in various ways, for example flying using one or more propellers or other aviation-related components, or traveling along one or more surfaces (e.g., a means of propulsion such as a motor or fan, and one or more wheels, gliders, etc.).

Drone 1002 may include various components and features according to various embodiments. For example, in some embodiments drone 1002 may include one or more airflow sensors configured to collect data and determine, independently or in conjunction with drone 1002, expected and actual vectors indicative of one or more airflows. In some aspects, drone 1002 may be an airflow sensor itself. Drone 1002 may also include one or more smoke generators, for example to allow drone 1002 to travel within building 10 and dispense smoke adjacent smoke detectors in order to test functionality of said smoke detectors. Drone 1002 may also be configured to test access detection systems and/or components within building 10. In some embodiments, drone 1002 is used in the commissioning systems and methods described in FIGS. 6-9. In some embodiments, the drone 1002 can include sensors and communication equipment configured to obtain commissioning information. In some embodiments, drone 1002 may provide test credentials to an access detection system of building 10, where drone 1002 travels within a proximity of access detection hardware of the access detection system. Additionally, drone 1002 may be configured to apply a force to one or more access points within building 10. For example, drone 1002 may contact a window or door (or other access point) in order to determine if one or more locking or security mechanisms of said window door is operating properly. If the window or door opens upon the application of the force from drone 1002, then drone 1002 may be configured to generate and communicate a message indicating that one or more mechanism (e.g., locks, smart locks, etc.) may not be functioning properly. As mentioned previously, drone 1002 may be in communication with one or more networks within building 10 and/or may be configured to communicate signals or other data via cloud communication and/or storage.

Drone 1002 may also be configured to perform other security and/or alarm features, according to some embodiments. For example, drone 1002 may be configured to be implemented in conjunction with one or more of building subsystems 428 such as security system 438 as shown and described with reference to FIG. 4. In some embodiments, drone 1002 may be configured to provide alarms and/or alerts to various personnel within an area (e.g., a warning prior to entering a secure room). The drone 1002 may also include one or more cameras configured to capture footage as drone 1002 travels throughout building 10. Collected footage may then be compared to footage captured on a permanent and/or stationary security system so as to detect a loop on one or more cameras. Additionally, drone 1002 may also be implanted in order to monitor personnel, for example in the context of safety protocol. In some embodiments, drone 1002 can identify protective and/or safety equipment (e.g., vests, hardhats, etc.) and provide warnings to personnel failing to follow various protocols (e.g., issue alarms, reminders, etc.). Drone 1002 may also be equipped with one or more infrared cameras to as to detect heat, for example from a piece of equipment that has malfunctioned or mistakenly been left on (e.g., a solder iron). Further, drone 1002 can be configured to disable such equipment or provide warnings to one or more personnel (e.g., an audible alarm in the area or a message sent to a remote location, for example) identifying the malfunction or mistakenly operated equipment. Drone 1002 can also be configured to include one or more sensors, for example T-sensors, to take various measurements. For example, drone 1002 may measure air quality using said T-sensors and/or may be configured to monitor proper operation of fume hoods within a designated area. Such T-sensors may also be implemented in order to calibrate other existing sensors within building 10, or may be configured to generate an offset for some specific sensors.

Drone 1002 may be configured to implement various techniques in order to move within and/or around building 10. For example, drone 1002 may be configured to apply a force to doors and/or windows in order to open said doors and/or windows. Additionally, drone 1002 may be configured to provide one or more signals indicating that a door or window can be opened to permit further movement of drone 1002 (e.g., drone 1002 beeps outside of a closed door until said door is opened thus allowing drone 1002 to proceed). Accordingly, drone 1002 may be configured to prevent tailgating at secured doors by providing said signals indicating the need for a door to be opened. Additionally, drone 1002 may be configured to provide other security features for both drone 1002 and system 1000 (as well as building 10). For example, drone 1002 may include one or more accelerometers or other similar microelectromechanical sensors (MEMS) configured to detect movement of drone 1002. Drone 1002 may be configured to shut off or otherwise disable access in response to being picked up, bumped, or identifying unknown sources of access to drone 1002 and/or other components of system 1000 as shown in FIG. 10.

In some embodiments, drone 1002 may include predetermined flight patterns or other rules governing movement of drone 1002. For example, drone 1002 may be configured to fly at a prescribed height so in one or more areas so as to promote safety and avoid collisions. Drone 1002 may also include other components to promote safety as drone 1002 moves throughout building 10. For example, drone 1002 may include a camera (as described previously) where drone 1002 may be configured to identify known images such as signage on doors or windows (e.g., recognize a men's or women's bathroom sign and not enter the bathroom). In some embodiments, drone 1002 may include a camera with infrared and/or night vision features. Drone 1002 may also include other components configured to provide spatial information to drone 1002 where drone 1002 then analyzes said date (e.g., one or more components of drone 1002 identify a desk, table, wall, etc. and drone 1002 avoids contact). Drone 1002 may also be configured to access one or more schedules via a network the same as or similar to network 446, for example. Further, drone 1002 may access a schedule of events for building 10 and adapt movement patterns through building 10 so as to avoid areas where events take place (e.g., drone bypasses a conference room where a meeting is in progress). Drone 1002 may also be configured to identify various different areas within building 10 and implement one or more algorithms in conjunction with system 1000 to distribute sensors and/or collect data from said areas so as to not interrupt events occurring in said areas.

In some embodiments, drone 1002 may be a nanodrone (e.g., a smaller version of drone 1002). Accordingly, components of system 1000 may be similarly adjusted in size so as to promote compatibility with drone 1002 (or nanodrones). In some embodiments, one or more nanodrones may be configured to move underneath doors and/or through other small openings within building 10 so as to travel throughout building 10 without assistance from building personnel. Additionally, in some embodiments multiple nanodrones may be disposed variously throughout building 10 to minimize movement/travel of a single drone such as drone 1002.

In some embodiments, drone 1002 may include one or more RFID sensors or other similar components. For example, drone 1002 may be releasably coupled with one or more RFID sensors such that said RFID sensors may be identified by other pieces of equipment within and/or around building 10. Drone 1002 may further be configured to include one or more sound sensors, according to some embodiments. Such sound sensors may be configured to listen to audio signals (e.g., capture and identify one or more sounds, record sounds, etc.) in order to perform fault detection for various equipment or other hardware within building 10. In order to identify one or more sounds, drone 1002 may be configured to identify a dominant frequency within a sound recording and filter out known or expected frequencies such that the dominant frequency may be analyzed further. Drone 1002 may further be configured to detect, monitor, and record vibration identified within a given area to perform similar fault detection for various components of a building (e.g., doors, security devices, etc.).

In some embodiments, drone 1002 may include one or more cameras. Drone 1002 may be configured to monitor inventory using a camera mounted on drone 1002, for example, or may able to monitor inventor otherwise (e.g., detect an RFID tag on a product, etc.). Inventory monitoring by drone 1002 may include, for example, counting products in a given area that have not yet been sold, and later counting products that have been sold to ensure that the products produced match the products sold. In some embodiments, drone 1002 may be configured to communicate inventory data via a network or cloud for further analysis by one or more other systems. Drone 1002 may also be configured to identify inventory according to markings on pieces of inventory. For example, drone 1002 (via a camera thereon) may be configured to identify an expiration date of produce and determine if produce has expired. Drone 1002 may also be configured to monitor temperature of inventory (e.g., produce) using a camera (e.g., infrared) so as to determine if inventory has been damaged or ruined as a result of storage temperature.

Drone 1002 may also be configured to control and/or operate various building equipment within building 10. For example, drone 1002 may be configured to command a damper, and may further be configured to monitor with one or more cameras any movement (or lack thereof) of the damper. Additionally, drone 1002 may include one or more spatial recognition features. For example, drone 1002 may be configured to identify one or more zones (e.g., areas within a larger area, rooms of a building, etc.) based on determinations of room size, proximity to other known components/areas, and/or locations relative to personnel.

In some embodiments, drone 1002 may be configured to provide instructions to personnel for performing various tasks including, for example, placing one or more sensors within building 10. Drone 1002 may be configured to provide instructions (e.g., audible, visual via a screen, etc.) to be followed by personnel. In some embodiments, drone 1002 may provide instructions to personnel for place sensors in various locations in or around building 10. Additionally, drone 1002 may be configured to identify sensors placed in or around building 10 that are malfunctioning, out of date, require retraining, or other possible functions that require maintenance from various personnel. Drone 1002 may also identify one or more conditions for an area (e.g., temperature, precipitation, etc.). Additionally, drone 1002 may be configured to perform maintenance checks on various components of building 10 or other components. For example, drone 1002 may check caulk/seals on doors or windows, identify windows to be washed, monitor hazards (e.g., spills), identify dark areas or broken lights, or other indications within building 10 that may indicate malfunction of one or more pieces of equipment.

In some embodiments, drone 1002 may be in communication with one or more other devices via a cloud and/or a network (e.g., network 446) so as to communicate with personnel via various devices. For example, drone 1002 may be configured to provide instruction to personnel via a cell phone or tablet, with the instructions based on conditions identified by drone 1002. Additionally, data collected by drone 1002 may be communicated and/or saved by drone 1002 using network 446, a cloud, or other data-related components. Further, in some embodiments, one or more drones the same as and/or similar to drone 1002 may be implemented within or around one or more buildings the same as and/or similar to building 10, with the one or more drones configured to communicate with one another.

As shown in the exemplary embodiment of FIG. 10, system 1000 is shown to include a sensor station 1006. Sensor station 1006 is shown to include a variety of sensors configured to be picked up by drone 1002, mounted on drone 1002, or otherwise releasably coupled to drone 1002. Sensors of sensor station 1006 are further configured to be releasably coupled to drone 1002 by drone 1002 (e.g., drone 1002 couples one or more sensors to drone 1002 independently of other personnel or equipment). Upon coupling with one or more sensors of sensor station 1006, drone 1002 may travel throughout a given area according to instructions or control provided by various personnel, or in response to identified conditions, alarms, predetermined patterns, or other desired routes.

Sensors of sensor station 1006 may be configured to sense one or more different conditions when releasably coupled with drone 1002 or to communicate with x=certain types of equipment. For example, drone 1002 may releasably couple to a sensory of sensor station 1006, with said sensor being a carbon dioxide sensor. In some embodiments, drone 1002 may couple to such a sensor according to a scheduled protocol, while in other embodiments drone 1002 may be configured to couple to such a sensor in response to an input indication a potential carbon dioxide presence (e.g., personnel indicates a gaseous smell has been reported in a given area). Drone 1002 may be configured to conduct a tour of a given area while coupled with said sensor such that drone 1002 may detect any possible presence of carbon dioxide according to the parameters of the sensor. In some embodiments, drone 1002 may remain coupled with said sensor while in other embodiments drone 1002 may be configured to place said sensor in a specific location (e.g., where a smell was reported) and return to charging station 1004. Additionally, in some embodiments drone 1002 and/or sensors of sensor station 1006 may include a wireless charger or other charging components.

In some embodiments, sensors of sensor station 1006 may be configured to perform various different functions (e.g., measure air quality, sense motion, measure humidity, etc.). Accordingly, different sensors may be configured to have different components in some embodiments. For example, a sensor may be configured to have a magnet, with said magnet configured to releasably couple with a corresponding magnet (or magnets) elsewhere within building 10 so as to couple the sensor with a wall, ceiling, door, window, or other surface. Additionally, in some embodiments a sensor may include one or more metal components configured to couple with a magnet or magnets positioned within building 10.

Figure 11:
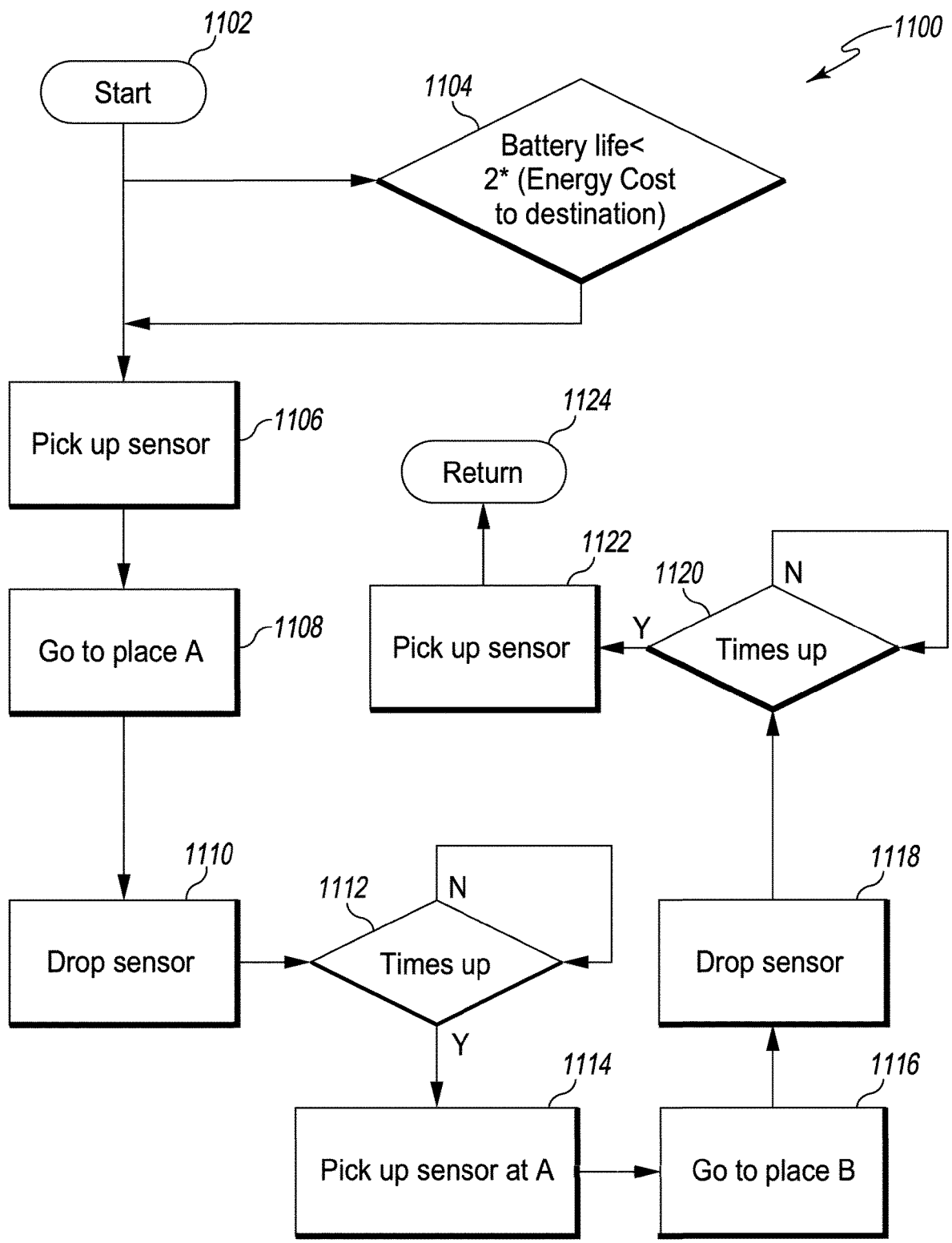
FIG. 11 is a process for adjusting and repositioning sensors, according to some embodiments.

Referring now to FIG. 11, a process 1100 for adjusting and repositioning sensors is shown, according to an exemplary embodiment. In some embodiments, process 1100 may be performed by drone 1002 within building 10, or may be performed by other components in other areas. Process 1100 is shown to include a start block (step 1102), which may correspond to drone 1002 configured on charging station 1004. In some embodiments, step 1102 may include drone 1002 receiving a signal from system 1000 (e.g., via network 446) providing instructions for drone 1002 to perform an action. In some embodiments, however, step 1102 may correspond to drone 1002 performing a scheduled action.

Process 1100 is shown to include determining if the battery life of drone 1002 is less than double the energy cost for drone 1002 to reach a given destination (step 1104), according to an exemplary embodiment. In some embodiments, step 1104 is performed in order to determine if drone 1002 has sufficient battery life to make a round-trip to a given destination. In some embodiments, drone 1002 (and/or system 1000) may repeatedly perform step 1104 until the battery of drone 1002 has sufficient battery power to perform a given function and/or travel to a given destination.

Process 1100 is shown to include picking up a sensor (step 1106), according to an exemplary embodiment. In some embodiments, step 1106 may include drone 1002 releasably coupling with one or more sensors from sensor station 1006. Process 1100 is further shown to include going to place A (step 1108), according to an exemplary embodiment. Step 1108 may be performed by drone 1002 after drone 1002 has releasably coupled with one or more sensors from sensor station 1006 after leaving charging station 1004. In some aspects, drone 1002 may follow a defined path to place A and may travel through one or more doors, windows, or other points of egress within building 10. In some embodiments, drone 1002 may be configured to travel based on spatial recognition, where drone 1002 is configured to analyze data collected by one or more sensors and/or cameras so as to travel throughout building 10 without colliding with objects or personnel.

Process 1100 is shown to include dropping the sensor at place A (step 1110), according to an exemplary embodiment. In some aspects step 1110 may include drone 1002 releasably coupling and/or decoupling with one or more sensors from sensor station 1006. Step 1110 may further include releasably coupling said sensor or sensors with a releasable coupling mechanism disposed at place A (e.g., a magnet, etc.). Process 1100 is also shown to include waiting for a prescribed time (step 1112), according to an exemplary embodiment. Step 1112 may include drone 1002 waiting a prescribed time at place A, where said prescribed time corresponds to a set time in which one or more sensors placed at place A collect data. In some embodiments, the prescribed time of step 1112 may vary for different sensors collecting different data (e.g., a sensor collecting temperature has a lesser prescribed time than a sensor collecting air quality data). In some embodiments, the sensor can be communication equipment capable of communicating with building equipment in the area. The communication equipment can be provided to obtain test data or to obtain commissioning data from the building equipment and store such data or communicate the data to other servers. The communication equipment can be a wireless device capable of communicating to the building equipment via WiFi, Bluetooth, Zigby, etc. or include a connector for connecting to a wired network (e.g., Ethernet, BacNet over wired, Master Slave Token Passing protocol network, Mod Bus, etc.)

Process 1100 is shown to include picking up the sensor left at place A (step 1114), according to an exemplary embodiment. Step 1114, in some embodiments, may include drone 1002 releasably coupling with one or more sensors that had been placed at place A previously by drone 1002 (e.g., in step 1110). Process 1100 is further shown to include going to place B (step 1116), as shown in the exemplary embodiment of FIG. 11. In some embodiments, step 1106 may include traveling to place B using a process the same as and/or similar to that used by drone 1002 in step 1108, where both place A and place B are disposed within or adjacent building 10. In some embodiments, drone 1002 and/or system 1000 may compute battery life of drone 1002 prior to and/or while drone 1002 performs step 1116.

Process 1100 is shown to include dropping one or more sensors at place B (step 1118), according to an exemplary embodiment. In some embodiments, drone 1002 may perform step 1118 the same as and/or similar to step 1108, and may include one or more sensors decoupling from drone 1002. Said one or more sensors may subsequently releasably couple with one or more components at place B (e.g., magnets, etc.). Process 1100 is further shown to include waiting a prescribed time at place B (step 1120), according to the exemplary embodiment of FIG. 11. In some embodiments, step 1120 may be performed by drone 1002 the same as and/or similar to step 1110 as performed previously in process 1100.

Process 1100 is shown to include picking up a sensor from place B (step 1122), according to an exemplary embodiment. In some embodiments, step 1122 may be performed by drone 1002 the same as and/or similar to step 1114 as performed previously in process 1100. In some embodiments, step 1122 may include drone 1002 releasably coupling with one or more sensors and securing said one or more sensors prior to drone 1002 traveling away from place B (step 1124), according to an exemplary embodiment. Process 1100 is further shown to include returning to charging station 1004, according to an exemplary embodiment. For example, step 1124 may include drone 1002 releasably coupling from one or more sensors positioned and/or repositioned during process 1100 prior to landing (e.g., docking, charging, etc.) on charging station 1004 so as to recharge the battery of drone 1002.

Figure 12A:
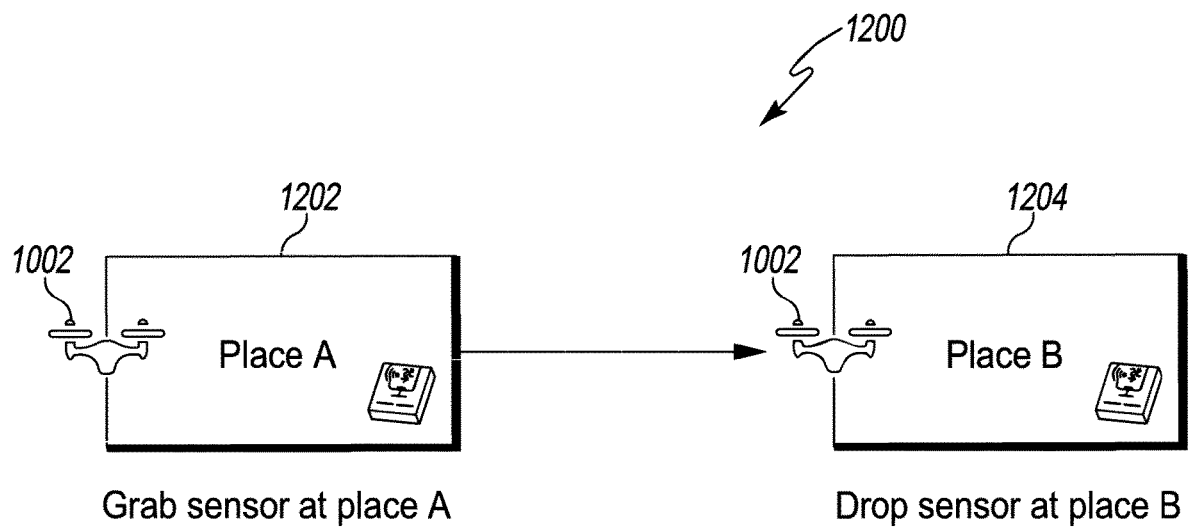
FIG. 12A is a schematic diagram of a mobile sensing system repositioning a sensor, according to some embodiments.

FIG. 12A is shown to include a schematic diagram of a mobile sensing system 1200 for repositioning a sensor, according to some embodiments. System 1200 is shown to include drone 1002 or similar picking up a sensor 1202 at place A, according to the exemplary embodiment of FIG. 12A. Further, as shown in FIG. 12A system 1200 includes drone 1002 placing a sensor 1204 at place B, according to an exemplary embodiment. In some aspects, drone 1002 is shown to reposition a sensor from place A (e.g., 1202) to place B (e.g., 1204) where place A and place B are positioned within or adjacent building 10 or another similar facility/area. In some embodiments, drone 1002 may be implemented in conjunction with system 1200 where drone 1002 transports one or more sensors between place A and B within building 10.

Figure 12B:
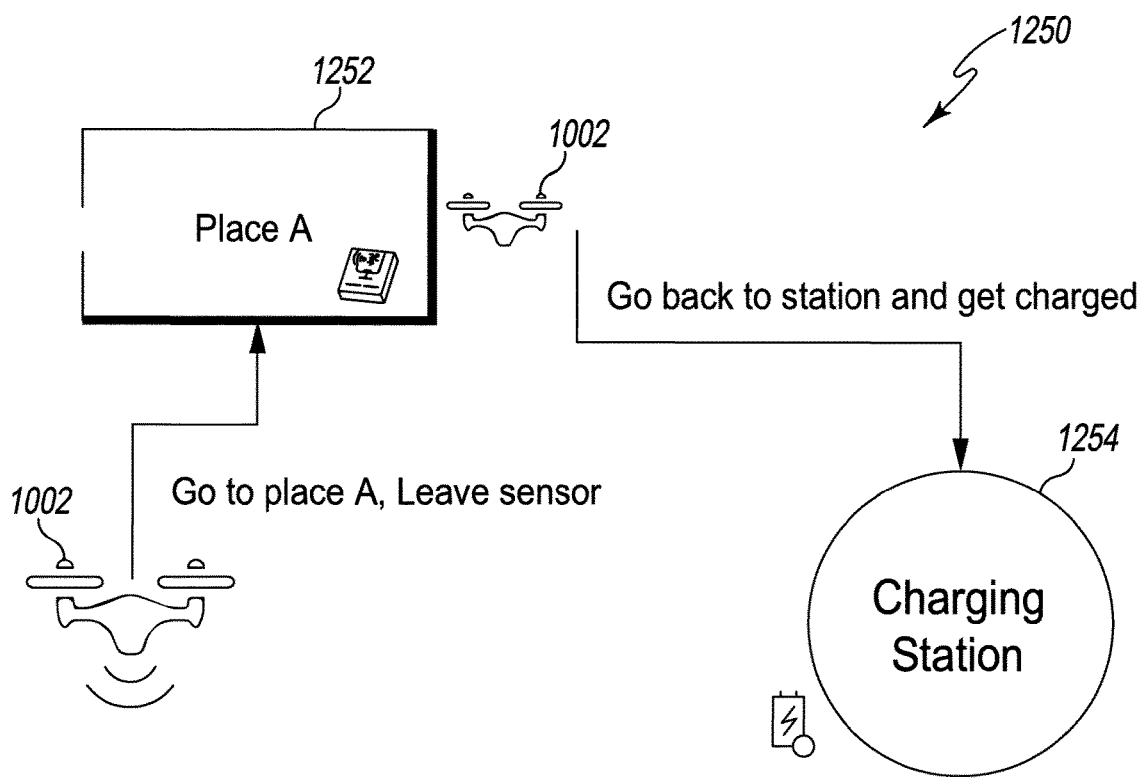
FIG. 12B is a schematic diagram of a mobile sensing system placing a sensor, according to some embodiments.

FIG. 12B is shown to include a schematic diagram of a mobile sensing system 1250 for placing a sensor, according to some embodiments. System 1250 is shown to include drone 1002 or similar placing a sensor 1252 at place A, according to the exemplary embodiment of FIG. 12B. Further, as shown in FIG. 12B system 1250 includes drone 1002 returning 1254 to charging station (e.g., charging station 1004), according to an exemplary embodiment. In some aspects, drone 1002 is shown to place and leave a sensor from place A (e.g., 1252), where drone 1002 then returns (e.g., 1254) to charging station 1004. In some embodiments, drone 1002 may be implemented in conjunction with system 1200 where drone 1002 transports one or more sensors to place A and returns to charging station 1004 within building 10. While drone 1002 travels as shown in FIG. 12B, drone 1002 may be configured to collect environmental via one or more sensors disposed on drone 1002.

Figure 13:
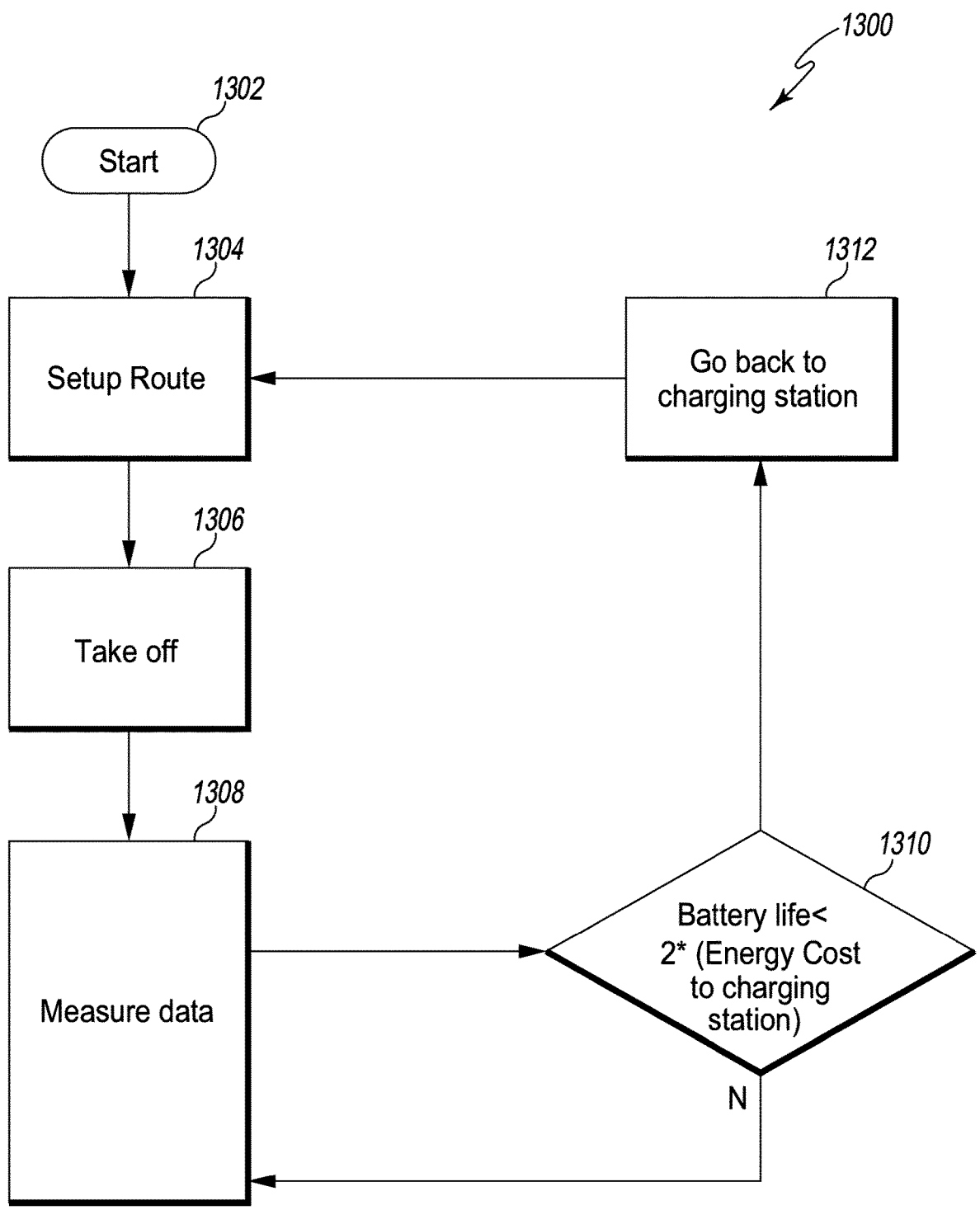
FIG. 13 is a process for measuring data using a mobile sensing system, according to some embodiments.

FIG. 13 is shown to include a process 1300 for measuring data using a mobile sensing system, according to some embodiments. In some embodiments, process 1300 may be implemented by system 1000 and components thereof, for example drone 1002. Process 1300 is shown to include drone 1002 starting (step 1302) and subsequently setting up a route (step 1304), according to the exemplary embodiment of FIG. 13. In some embodiments, step 1304 may include drone 1002 setting up a defined and prescribed path, for example based on floorplan of building 10 (or similar) or may further include drone 1002 setting up a path so as to collect environmental data on the way to a specific area or portion of a route.

Process 1300 is shown to include drone 1002 taking off (step 1306), according to an exemplary embodiment. In some aspects, step 1306 may include drone 1002 leaving charging station 1004 before proceeding on a route as set up in step 1304 as described previously. In some embodiments, drone 1002 may include one or more sensors configured to collect environmental data with said sensors disposed variously about drone 1002. Process 1300 is further shown to include drone 1002 measuring data (step 1308), where drone 1002 collects environmental data and/or measurements while traveling along the route set up in step 1304.

Process 1300 is shown to include determining if the battery life of drone 102 is less than or equal to twice the energy cost for drone 1002 to return to charging station 1004 (step 1310), according to an exemplary embodiment. In some aspects, the determination of step 1310 may include system 1000 performing one or more calculations, for example, the energy expenditure of drone 1002 in step 1308 relative to data collected in step 1308. If step 1310 includes a determination that drone 1002 (and/or a battery thereof) has greater than twice the energy cost for drone 1002 to return to charging station 1004, drone 1002 may repeat step 1308 one or more times so as to collect additional environmental data. Process 1300 is further shown to include drone 1002 returning to charging station 1004 (step 1312) if step 1310 includes a determination that drone 1002 (and/or a battery thereof) includes less than twice the energy cost for drone 1002 to return to charging station 1004. In some embodiments, drone 1002 may repeat step 1310 (set up route) following step 1312 in which drone 1002 returns to charging station 1004.

Figure 14:
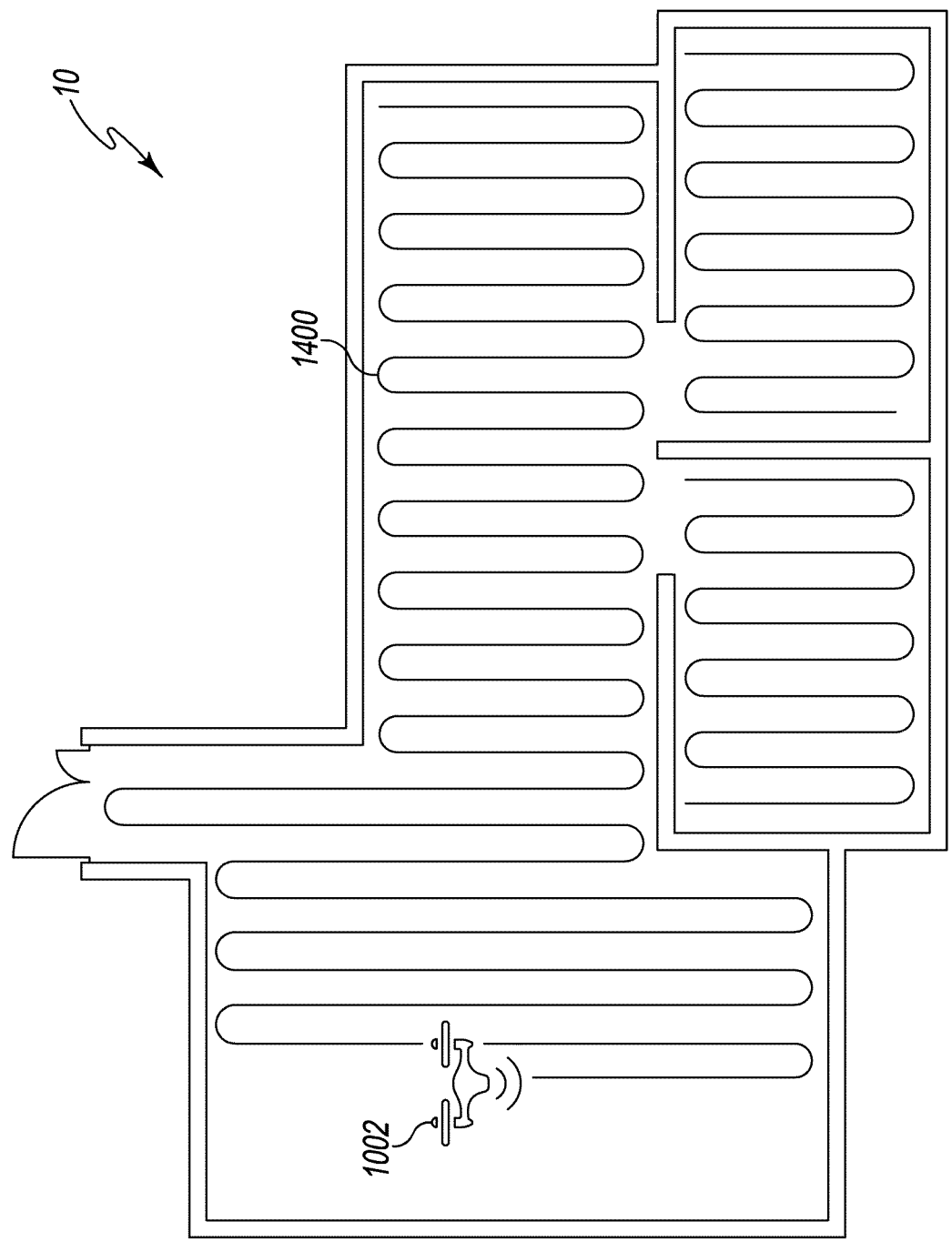
FIG. 14 is a drawing of a route of a component of a mobile sensing system to travel for adjusting, positioning, and measuring data from sensors, according to some embodiments.

FIG. 14 is shown to include a drawing of a route 1400 of a mobile sensing system for adjusting, positioning, and measuring data from sensors, according to some embodiments. FIG. 14 is shown to include drone 1002 within building 10, where drone 1002 is configured to travel along route 1400. In some embodiments, drone 1002 may be configured to collect environmental data while traveling throughout building 10 along route 1400. For example, drone 1002 may collect temperature data, air quality, as well as other data via sensors disposed on drone 1002 while traveling route 1400 through the various areas of building 10. In some aspects, drone 1002 may deviate from route 1400 based on remaining battery of drone 1002 (and/or a battery thereof). In some embodiments, process 1300 may be applied to route 1400 so as to collect environmental data from building 10 iteratively based on set up routes (e.g., in step 1304).

Figure 15:
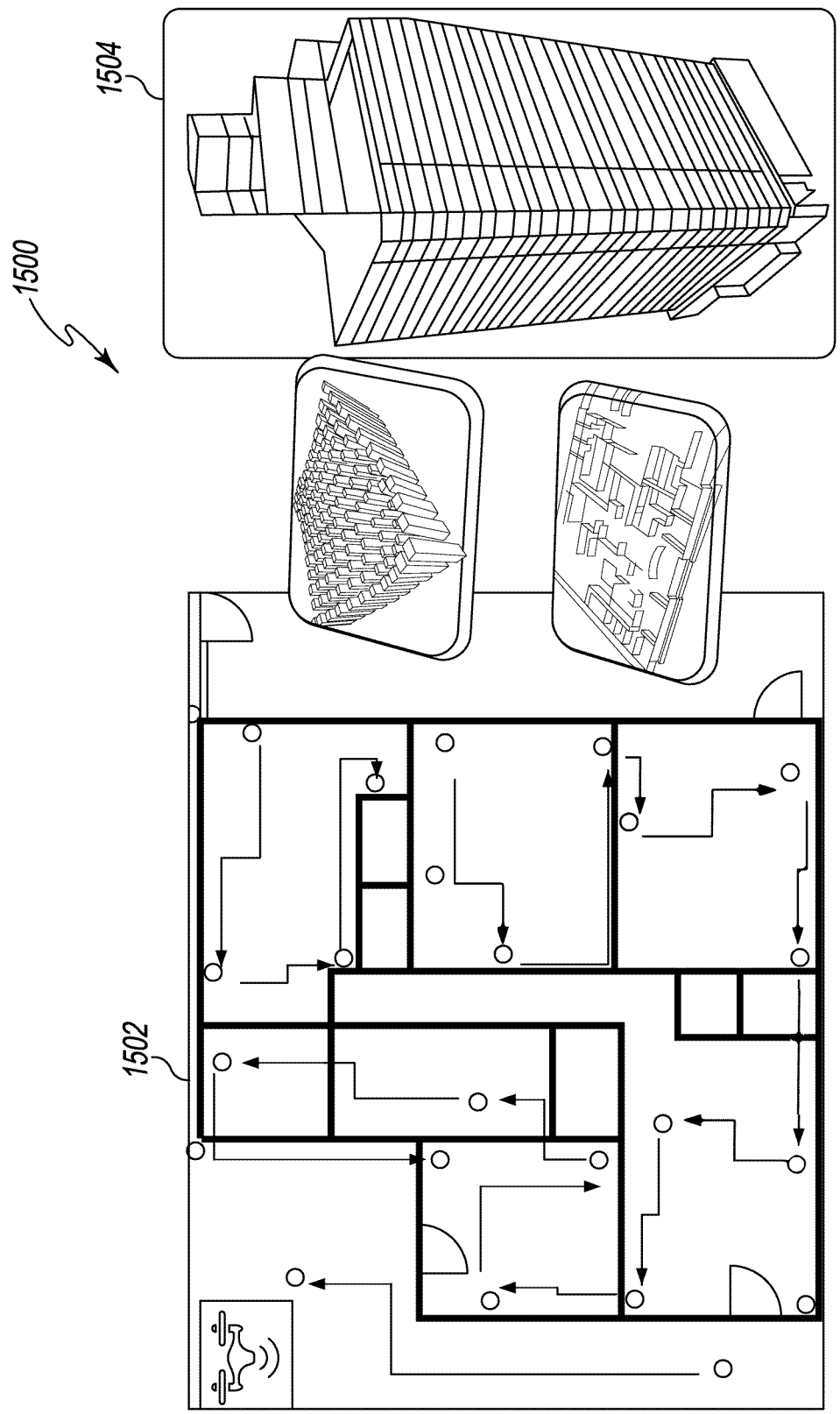
FIG. 15 is a drawing of map generated by a mobile sensing system in response to data collected from a component of the mobile sensing system, according to some embodiments.

FIG. 15 is a drawing of map 1500 generated by a mobile sensing system in response to data collected from a component of the mobile sensing system, according to some embodiments. Map 1500 is shown to include a heat map 1502 of a portion of building 10, according to an exemplary embodiment. Drone 1002, while traveling route 1400 and performing process 1300 collects environmental data for building 10. Said environmental data may be processed by system 1000, where system 1000 is configured to generate map 1500. Map 1500 is shown to include heat map 1502 configured to show a top view (e.g., bird's eye) of an area of building 10. Heat map 1502 may be configured to show temperature and/or airflow within building 10, for example as a result of HVAC activity or other air movement patterns (and/or energy/building efficiencies/deficiencies). Map 1500 is further shown to include building map 1504, which is shown to include multiple levels of building 10. For example, if building 10 includes four levels, heat map 1502 may include a top view of a heat map for one of the floors of building 10 while building map 1504 shows a side view of building 10 (e.g., indicating heat mapping of floors of building 10 from a side perspective). In some embodiments, both heat map 1502 and building map 1504 may be generated by system 1000 in response to environmental data collected by drone 1002 and sensors thereof performing process 1300 along route 1400 (as shown in FIGS. 13-14, respectively).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain operation or group of operations.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A mobile commissioning device for commissioning building equipment in or around a building, the mobile commissioning device comprising:
    a processing circuit comprising a processor and memory storing instructions executed by the processor, the processing circuit configured to:
        establish a location of the mobile commissioning device and subsequently determine a location of the building equipment within the building based on the location of the mobile commissioning device;
        detect and receive commissioning data from the building equipment located within a plurality of building zones of the building as the mobile commissioning device autonomously moves between the plurality of building zones; and
        transmit the commissioning data from the mobile commissioning device to a server; and
    one or more relay devices configured to receive device signals from the building equipment and transmit relay signals to the mobile commissioning device.

2. The mobile commissioning device of claim 1, further comprising a mobile server and a battery.

3. The mobile commissioning device of claim 1, wherein the mobile commissioning device is configured to determine and store location data relating to both the mobile commissioning device as well as the building equipment.

4. The mobile commissioning device of claim 1, wherein the one or more relay devices are positioned and can be repositioned within the plurality of building zones of the building.

5. The mobile commissioning device of claim 1, wherein the device signals received by the one or more relay devices from the building equipment contain commissioning data, and the relay signals transmitted by the one or more relay devices to the mobile commissioning device contain commissioning data received by the one or more relay devices from the building equipment.

6. The mobile commissioning device of claim 1, wherein the processing circuit is configured to store commissioning data in accordance with a data structure used by the server such that the server can use commissioning data during operation without additional processing.

7. The mobile commissioning device of claim 1, wherein the mobile commissioning device is configured to move along a predetermined path through one or more of the plurality of building zones in order to commission the building equipment.

8. The mobile commissioning device of claim 1, further comprising propulsion hardware operable to autonomously move the mobile commissioning device between the plurality of building zones.

9. The mobile commissioning device of claim 1, wherein the processing circuit is configured to:
    store the commissioning data from the building equipment in a temporary commissioning database within the mobile commissioning device; and
    transmit the commissioning data from the temporary commissioning database to the server.

10. The mobile commissioning device of claim 1, wherein the server comprises at least one of a temporary server, a permanent server, an on premise server, or an off premise server.

11. A system for commissioning building equipment in or around a building, the system comprising:
- a mobile commissioning device comprising:
  - a processing circuit comprising a processor and memory storing instructions executed by the processor, the processing circuit configured to:
    - establish a location of the mobile commissioning device and subsequently determine a location of the building equipment within the building based on the location of the mobile commissioning device;
    - detect and receive commissioning data from the building equipment located within a plurality of building zones of the building as the mobile commissioning device autonomously moves between the plurality of building zones; and
    - transmit the commissioning data from the mobile commissioning device to a server; and
- one or more relay devices configured to receive device signals from the building equipment and transmit relay signals to the mobile commissioning device.

12. The system of claim 11, wherein the mobile commissioning device comprises a drone configured to move through the plurality of building zones.

13. The system of claim 11, further comprising a mobile server and a battery.

14. The system of claim 11, wherein the mobile commissioning device is configured to determine and store location data relating to both the mobile commissioning device as well as the building equipment.

15. The system of claim 11, wherein the one or more relay devices are positioned and can be repositioned within the plurality of building zones of the building.

16. The system of claim 11, wherein the device signals received by the one or more relay devices from the building equipment contain commissioning data, and the relay signals transmitted by the one or more relay devices to the mobile commissioning device contain commissioning data received by the one or more relay devices from the building equipment.

17. The system of claim 11, wherein the processing circuit is configured to store commissioning data in accordance with a data structure used by the server such that the server can use commissioning data during operation without additional processing.

18. A method of commissioning building equipment of a building using a mobile commissioning device comprising a processing circuit, wherein the processing circuit comprises a processor and memory storing instructions executed by the processor, the method comprising:
- establishing a location of the mobile commissioning device and subsequently determining a location of the building equipment within the building based on the location of the mobile commissioning device;
- detecting and receiving commissioning data from the building equipment located within a plurality of building zones of the building as the mobile commissioning device autonomously moves between the plurality of building zones;
- transmitting the commissioning data from the mobile commissioning device to a server; and
- receiving device signals from the building equipment at one or more relay devices and transmitting relay signals from the one or more relay devices to the mobile commissioning device.

* * * * *